US011608062B2

(12) United States Patent
Takei et al.

(10) Patent No.: US 11,608,062 B2
(45) Date of Patent: Mar. 21, 2023

(54) VEHICLE CONTROL METHOD AND VEHICLE CONTROL DEVICE

(71) Applicants: Nissan Motor Co., Ltd., Yokohama (JP); Renault S.A.S., Boulogne-Billancourt (FR)

(72) Inventors: Shoichi Takei, Kanagawa (JP); Shinya Tanaka, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/780,115

(22) PCT Filed: Dec. 2, 2019

(86) PCT No.: PCT/IB2019/001353
§ 371 (c)(1),
(2) Date: May 26, 2022

(87) PCT Pub. No.: WO2021/111164
PCT Pub. Date: Jun. 10, 2021

(65) Prior Publication Data
US 2022/0410890 A1 Dec. 29, 2022

(51) Int. Cl.
*B60W 30/00* (2006.01)
*B60W 30/14* (2006.01)
(52) U.S. Cl.
CPC ....... *B60W 30/143* (2013.01); *B60W 2520/00* (2013.01); *B60W 2554/20* (2020.02); *B60W 2554/4041* (2020.02)

(58) Field of Classification Search
None
See application file for complete search history.

(56) References Cited

U.S. PATENT DOCUMENTS

| 10,037,036 | B2 * | 7/2018 | Nilsson | B60W 30/143 |
| 10,882,535 | B2 * | 1/2021 | Lan | G05D 1/0088 |
| 10,928,830 | B1 * | 2/2021 | Tran | G05D 1/0088 |
| 11,124,204 | B1 * | 9/2021 | Narang | B60W 30/09 |

(Continued)

FOREIGN PATENT DOCUMENTS

| JP | 2008-102690 A | 5/2008 |
| JP | 2017-224237 A | 12/2017 |

*Primary Examiner* — Jonathan M Dager
(74) *Attorney, Agent, or Firm* — Young Basile Hanlon & MacFarlane, P.C.

(57) ABSTRACT

A controller causes a host vehicle to decelerate when a velocity of an oncoming vehicle corresponding to a position of the oncoming vehicle distant from a stationary object by a predetermined distance is greater than or equal to a velocity threshold corresponding to the position of the oncoming vehicle distant from the stationary object by the predetermined distance in a case in which a passing position is present within a predetermined region, and causes the host vehicle to keep the velocity or accelerate when the velocity of the oncoming vehicle corresponding to the position of the oncoming vehicle distant from the stationary object by the predetermined distance is less than the velocity threshold corresponding to the position of the oncoming vehicle distant from the stationary object by the predetermined distance in the case in which the passing position is present within the region.

18 Claims, 13 Drawing Sheets

(56) References Cited

U.S. PATENT DOCUMENTS

| | | | |
|---|---|---|---|
| 11,325,589 B2* | 5/2022 | Nagashima | B60R 21/0134 |
| 11,420,630 B2* | 8/2022 | Dax | B60W 30/0956 |
| 11,433,885 B1* | 9/2022 | Beller | B60W 30/095 |
| 2018/0259967 A1* | 9/2018 | Frazzoli | B60W 30/095 |
| 2019/0202450 A1* | 7/2019 | Maeda | B60W 10/184 |
| 2019/0243371 A1* | 8/2019 | Nister | G05D 1/0242 |
| 2019/0278290 A1* | 9/2019 | Zhang | G01C 21/3848 |
| 2019/0333386 A1 | 10/2019 | Horita et al. | |
| 2019/0369626 A1* | 12/2019 | Lui | G05D 1/0221 |
| 2020/0086855 A1* | 3/2020 | Packer | B60W 60/00276 |
| 2020/0139959 A1* | 5/2020 | Akella | B60W 30/025 |
| 2020/0180648 A1* | 6/2020 | Lan | G06T 7/20 |
| 2021/0094538 A1* | 4/2021 | Beller | B60W 30/09 |
| 2021/0197808 A1* | 7/2021 | Maeda | B60W 60/005 |
| 2021/0370921 A1* | 12/2021 | Silva | B60W 60/0027 |
| 2022/0105926 A1* | 4/2022 | Zhang | G08G 1/166 |
| 2022/0135029 A1* | 5/2022 | Poubel Orenstein | B60W 30/0956 701/301 |
| 2022/0176948 A1* | 6/2022 | Hasegawa | B60W 30/0956 |

\* cited by examiner

VEHICLE CONTROL METHOD AND VEHICLE CONTROL DEVICE

TECHNICAL FIELD

The present invention relates to a vehicle control method and a vehicle control device.

BACKGROUND

A drive assistance device is known that avoids an encounter with an oncoming vehicle when there is a probability that the oncoming vehicle could project from the oncoming lane toward the own lane (Japanese Unexamined Patent Application Publication No. 2008-102690). The invention disclosed in Japanese Unexamined Patent Application Publication No. 2008-102690 determines whether a passing route of the oncoming vehicle overlaps with the own lane in accordance with a distance between a parked vehicle in the oncoming lane and the center line of the road. The invention disclosed in Japanese Unexamined Patent Application Publication No. 2008-102690 causes the host vehicle to stop or decelerate when the passing route of the oncoming vehicle is determined to overlap with the own lane.

SUMMARY

The invention disclosed in Japanese Unexamined Patent Application Publication No. 2008-102690 does not take account of the intention of the driver of the oncoming vehicle and thus could cause the host vehicle to decelerate or stop unnecessarily even when the host vehicle and the oncoming vehicle can pass each other without close encounter.

To solve the conventional problem described above, the present invention provides a vehicle control method and a vehicle control device configured to take account of an intention of a driver of an oncoming vehicle.

A vehicle control method according to an aspect of the present invention detects a position of a stationary object on a road on which a host vehicle is traveling, detects a velocity of the host vehicle, detects a position and a velocity of an oncoming vehicle traveling in a direction opposite to a traveling direction of the host vehicle in an oncoming lane adjacent to a traveling lane in which the host vehicle is traveling, sets a region on the road defined in an extending direction of the road including the stationary object, calculates a passing position at which the host vehicle and the oncoming vehicle pass each other in accordance with the velocity of the host vehicle and the position and the velocity of the oncoming vehicle, sets a velocity threshold that is greater as a distance between the stationary object and the oncoming vehicle is longer, causes the host vehicle to decelerate when the velocity of the oncoming vehicle corresponding to the position of the oncoming vehicle distant from the stationary object by a predetermined distance is greater than or equal to the velocity threshold corresponding to the position of the oncoming vehicle distant from the stationary object by the predetermined distance in a case in which the passing position is present within the region, and causes the host vehicle to keep the velocity or accelerate when the velocity of the oncoming vehicle corresponding to the position of the oncoming vehicle distant from the stationary object by the predetermined distance is less than the velocity threshold corresponding to the position of the oncoming vehicle distant from the stationary object by the predetermined distance in the case in which the passing position is present within the region.

The present invention takes account of the intention of the driver of the oncoming vehicle, so as to avoid sudden braking or unnecessary acceleration or deceleration.

DETAILED DESCRIPTION

Figure 1:
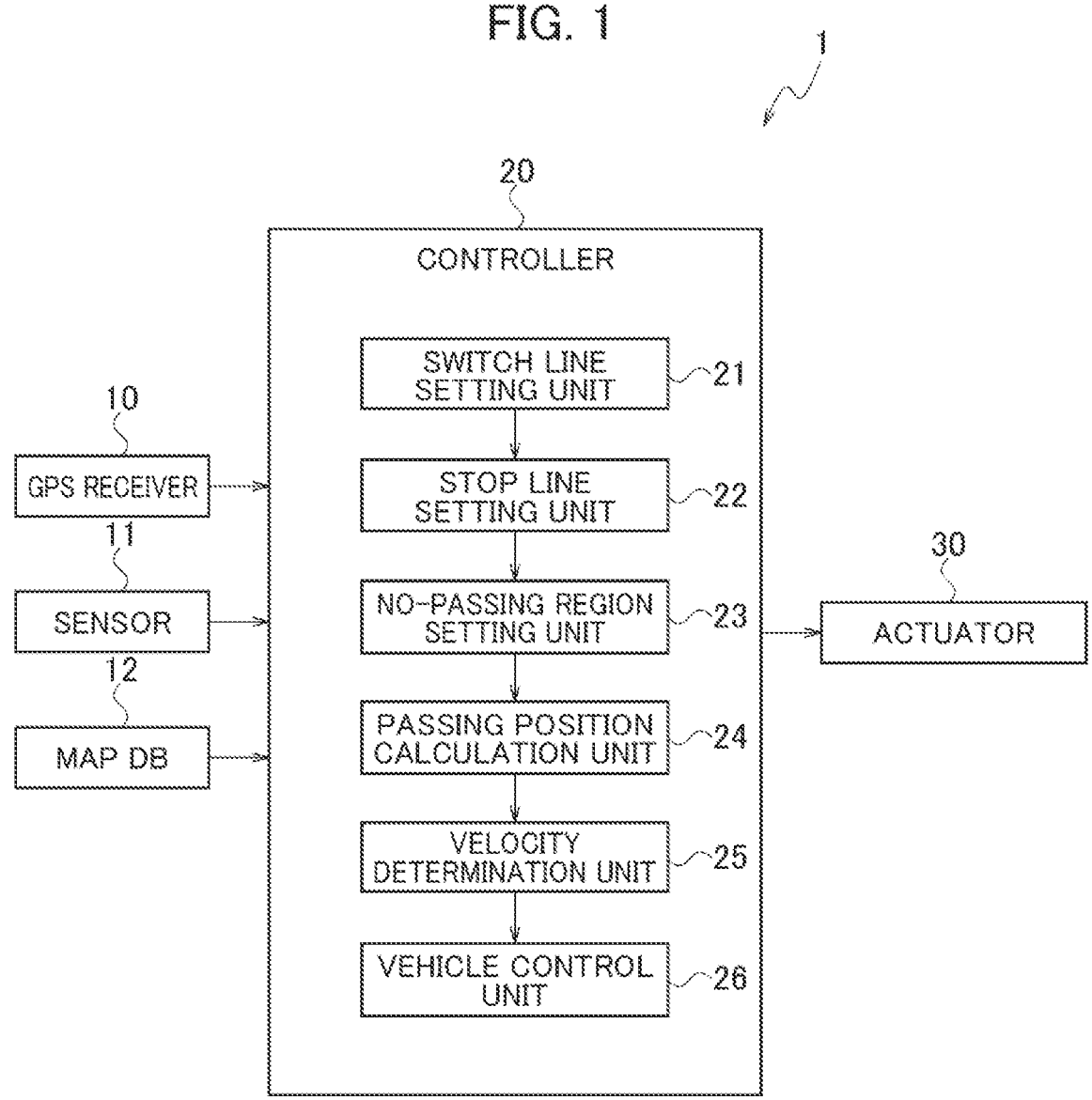
FIG. 1 is a schematic configuration diagram of a vehicle control device according to a first embodiment of the present invention.

Hereinafter, some embodiments according to the present invention are described with reference to the drawings. The same elements illustrated in the drawings are denoted by the same reference numerals, and overlapping explanations are not made below.

First Embodiment

<Configuration Example of Vehicle Control Device>

A configuration example of a vehicle control device 1 according to a first embodiment is described below with reference to FIG. 1. As illustrated in FIG. 1, the vehicle control device 1 includes a GPS receiver 10, a sensor 11, a map database 12, a controller 20, and several kinds of actuators 30.

The vehicle control device 1 may be mounted on either a vehicle equipped with an automated driving function or a vehicle without equipped with an automated driving function. The vehicle control device 1 may be mounted on a vehicle capable of switching between automated driving and manual driving. The term "automated driving" as used in the first embodiment refers to a state in which at least any of actuators such as a brake, an accelerator, and a steering wheel is controlled without the intervention of the occupant. The automated driving thus can include a state in which other actuators are operated by the occupant. The automated driving also refers to a state in which any control such as acceleration/deceleration control and lateral positioning control only needs to be executed. The term "manual driving" as used in the first embodiment refers to a state in which the occupant operates the brake, the accelerator, and the steering wheel, for example.

The GPS receiver 10 receives radio waves from an artificial satellite so as to detect positional information of the host vehicle on the ground. The positional information of the host vehicle detected by the GPS receiver 10 includes the information on latitude and the information on longitude. The GPS receiver 10 outputs the detected positional information of the host vehicle to the controller 20. The way of detecting the positional information of the host vehicle is not limited to the GPS receiver 10. For example, odometry may be used to estimate the position of the host vehicle. Odometry is a way of obtaining a moving amount and an advancing direction of a vehicle in accordance with a rotation angle and an angular velocity of the vehicle so as to estimate the position of the vehicle.

The sensor 11 is a device mounted on the host vehicle to detect objects around the host vehicle. The sensor 11 includes several kinds of sensors such as a camera, lidar, a radar, a millimeter-wave radar, a laser rangefinder, and a sonar. The sensor 11 detects, as objects around the host vehicle, moving objects including other vehicles, motorcycles, bicycles, and pedestrians, and stationary objects including obstacles, fallen objects, and parked vehicles. The sensor 11 also detects a position, an attitude (a yaw angle), a size, a velocity, an acceleration rate, a deceleration rate, and a yaw rate of the respective moving objects and stationary objects with respect to the host vehicle. The sensor 11 may also include other sensors such as a wheel speed sensor (a second sensor), a steering angle sensor, and a gyro sensor. The wheel speed sensor detects a speed of rotation of the wheels of the host vehicle. Detecting the speed of rotation can obtain a velocity of the host vehicle. The sensor 11 outputs the detected information to the controller 20.

The map database 12 is a database stored in a car navigation device, for example, and includes map information such as road information and facility information necessary for route guidance. The road information refers to information on the number of lanes on a road, road boundary lines, and a relation of connection of lanes. The map database 12 outputs the map information to the controller 20 in response to the request from the controller 20.

While the first embodiment is illustrated with the case in which the vehicle control device 1 includes the map database 12, the vehicle control device 1 does not necessarily include the map database 12. The map information may be acquired by the sensor 11, or may be acquired through vehicle-to-vehicle communications or road-to-vehicle communications. When the map information is stored in a server externally installed, the vehicle control device 1 may acquire the map information from the server through communications as necessary. The vehicle control device 1 may regularly acquire the latest map information from the server so as to update the stored map information.

The controller 20 is a general-purpose microcomputer including a central processing unit (CPU), a memory, and an input-output unit. A computer program is installed on the microcomputer so as to function as the vehicle control device 1. The microcomputer functions as a plurality of information processing circuits included in the vehicle control device 1 when the computer program is executed. While the present embodiment is illustrated with the case in which the software is installed to fabricate the respective information processing circuits included in the vehicle control device 1, dedicated hardware for executing each information processing as described below can be prepared to compose the information processing circuits. The respective information processing circuits may be composed of individual hardware. The controller 20 includes, as examples of the plural information processing circuits, a switch line setting unit 21, a stop line setting unit 22, a no-passing region setting unit 23, a passing position calculation unit 24, a velocity determination unit 25, and a vehicle control unit 26.

The switch line setting unit 21 integrates the positional information of the host vehicle output from the GPS receiver 10 and the position of the moving object or the stationary object output from the sensor 11 with the map information output from the map database 12, and generates map information including the position of the host vehicle and the position of the moving object or the stationary object. The switch line setting unit 21 sets a virtual switch line on the map extending in the lane width direction in the oncoming lane adjacent to the traveling lane in which the host vehicle is traveling. For example, when a parked vehicle is detected in the oncoming lane, the switch line setting unit 21 sets the switch line on the map in the oncoming lane at a position distant from the parked vehicle by a predetermined distance in the traveling direction of the host vehicle. The term "position" as used herein refers to a position on the map unless otherwise specified.

The stop line setting unit 22 sets a virtual stop line extending in the lane width direction in the traveling lane in which the host vehicle is traveling. For example, when a parked vehicle is detected in the oncoming lane, the stop line setting unit 22 sets the stop line in the traveling lane at a position distant from the parked vehicle by a predetermined distance in the traveling direction of an oncoming vehicle. The oncoming vehicle is a vehicle traveling in the oncoming lane. The stop line is set at a position at which the host vehicle can stop at a predetermined deceleration rate after starting decelerating from the current position. The stop line is also set at a position at which the host vehicle can avoid a collision with the oncoming vehicle that is traveling in the oncoming lane and could project to the traveling lane so as to avoid the parked vehicle. The predetermined distance used for setting the switch line may be the same as or different from the predetermined distance used for setting the stop line.

The no-passing region setting unit 23 sets a no-passing region in accordance with the switch line and the stop line set by the switch line setting unit 21 and the stop line setting unit 22. The no-passing region setting unit 23 sets, as the no-passing region, a region including the switch line and the stop line on the road defined between the switch line and the stop line. The no-passing region is set on the road around the parked vehicle. The first embodiment sets the no-passing region as a region in which the host vehicle is prohibited from passing the oncoming vehicle.

The passing position calculation unit 24 determines whether the position at which the host vehicle and the oncoming vehicle pass each other is present within the no-passing region set by the no-passing region setting unit 23. In particular, the passing position calculation unit 24 calculates the passing position at which the host vehicle passes the oncoming vehicle in accordance with a relative distance between the host vehicle and the oncoming vehicle, a velocity of the host vehicle, and a velocity of the oncoming vehicle. The passing position calculation unit 24 then determines whether the calculated passing position is present within the no-passing region. The relative distance between the host vehicle and the oncoming vehicle, the velocity of the host vehicle, and the velocity of the oncoming vehicle are detected by the sensor 11.

When the passing position calculation unit 24 determines that the passing position is present within the no-passing region, the velocity determination unit 25 estimates an intention of the driver of the oncoming vehicle when the oncoming vehicle is manual driving or estimates an action expected by a driving control device of the oncoming vehicle when the oncoming vehicle is automated driving (collectively referred to below as an "intention of the oncoming vehicle") so as to determines a velocity of the host vehicle. The following explanations are made on the presumption that the oncoming vehicle is the manual driving and operated by the driver for illustration purposes and brevity. The intention of the oncoming vehicle is described in detail below.

The vehicle control unit 26 controls the respective actuators 30 so as to cause the host vehicle to travel at the velocity determined by the velocity determination unit 25. The actuators 30 include a brake actuator, an accelerator pedal actuator, and a steering actuator.

Figure 2:
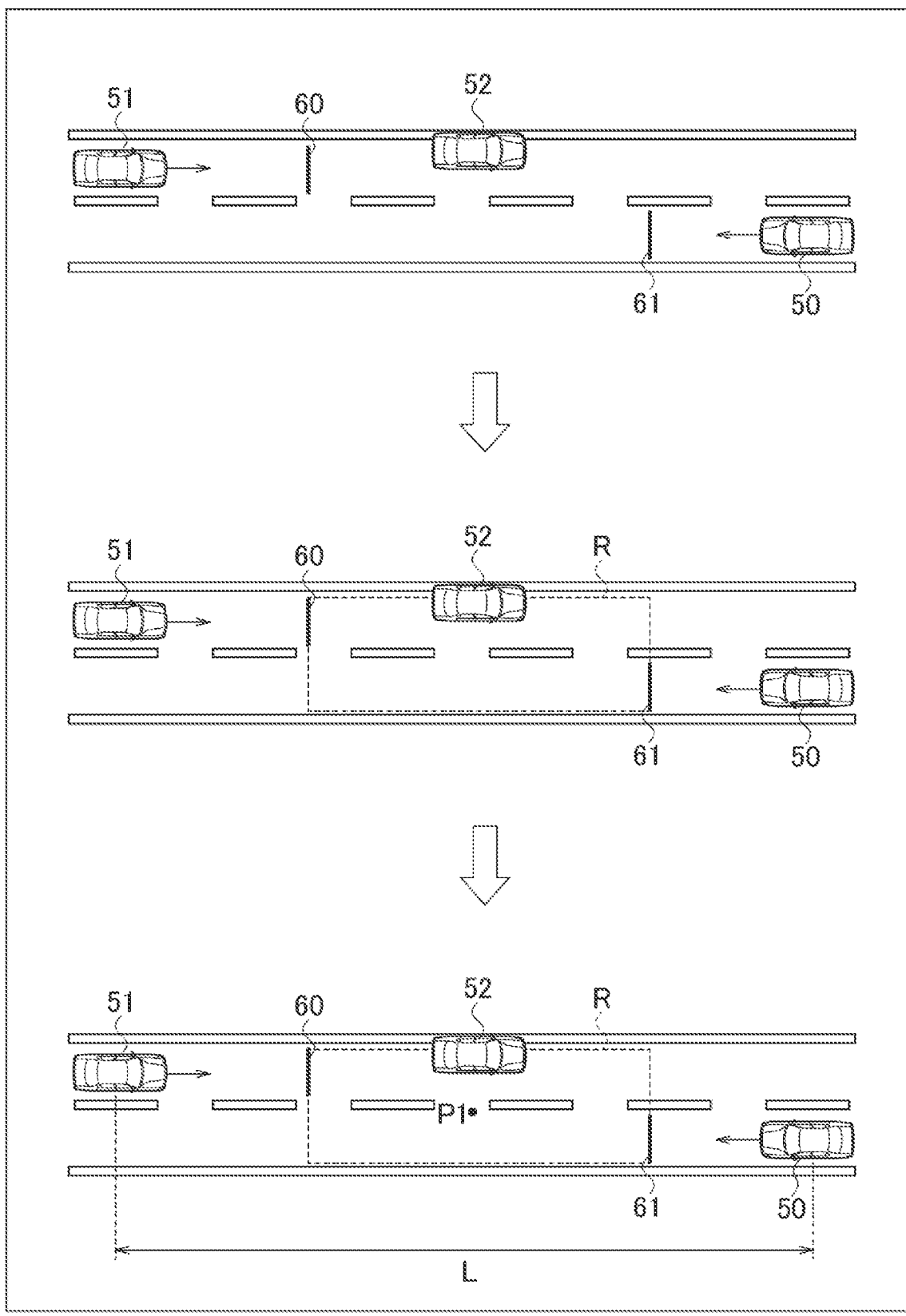
FIG. 2 is a view explaining an example of a method of setting a switch line according to the first embodiment of the present invention.

An example of a method of setting the switch line is described below with reference to FIG. 2. FIG. 2 illustrates a road with one lane in each direction. FIG. 2 illustrates the case in which the host vehicle 50 is traveling toward the left, and the oncoming vehicle 51 is traveling toward the right. The traveling direction of the host vehicle 50 is opposite to the traveling direction of the oncoming vehicle 51. The lane in which the host vehicle 50 is traveling is herein referred to as a traveling lane, and the lane in which the oncoming vehicle 51 is herein traveling is referred to as an oncoming lane. The oncoming lane is located next to the traveling lane.

In the situation illustrated in FIG. 2, the parked vehicle 52 and the oncoming vehicle 51 are presumed to be detected by the sensor 11. In particular, the positional information and velocity of the parked vehicle 52 and the positional information and velocity of the oncoming vehicle 51 are presumed to be detected by the sensor 11. For example, the positional information of the parked vehicle 52 and the positional information of the oncoming vehicle 51 are detected by a laser rangefinder (a first sensor, a third sensor).

The laser rangefinder emits radio waves to scan the objects (the parked vehicle 52 and the oncoming vehicle 51 in this case), and measures the reflected radio waves so as to acquire the distance and the direction to the respective objects. The position of the parked vehicle 52 and the position of the oncoming vehicle 51 may each be detected as a relative position with respect to the position of the host vehicle 50 or detected as a position on the coordinates based on the position of the host vehicle 50 as the origin.

The velocity of the parked vehicle 52 and the velocity of the oncoming vehicle 51 are detected by a camera (a fourth sensor), for example. A difference between a current image captured by the camera and an image of the immediately previous frame is extracted, so as to acquire the velocity of the parked vehicle 52 and the velocity of the oncoming vehicle 51. A frame rate of the camera can be, but not necessarily, set to either 30 frames per second (fps) or 60 fps. The parked vehicle 52 in the first embodiment is determined to be a stationary object, since the velocity of the parked vehicle 52 is detected to be zero. Namely, the object detected around the host vehicle 50 is determined to be a stationary object when the velocity of the object is zero or is a quite low velocity so as to be presumed to be approximately zero. While the first embodiment illustrates the parked vehicle 52 as a stationary object, the stationary object is not limited to the parked vehicle 52. Examples of stationary objects include a fallen object and a pylon (also called a road cone). The parked vehicle 52 is located in the oncoming lane.

As illustrated in FIG. 2, the switch line setting unit 21 sets a virtual switch line 60 extending in the lane width direction in the oncoming lane at a position distant from the parked vehicle 52 by a predetermined distance in the traveling direction of the host vehicle 50. The stop line setting unit 22 sets a virtual stop line 61 extending in the lane width direction in the traveling lane at a position distant from the parked vehicle 52 by a predetermined distance in the traveling direction of the oncoming vehicle 51.

After the switch line 60 and the stop line 61 are set by the switch line setting unit 21 and the stop line setting unit 22, the no-passing region setting unit 23 sets a no-passing region R including the switch line 60 and the stop line 61 on the road defined in a region between the switch line 60 and the stop line 61. In particular, as illustrated in FIG. 2, the no-passing region R is a region including the switch line 60 and the stop line 61 and defined by the switch line 60 and the stop line 61 on the road. The shape of the no-passing region R can be determined as appropriate, and may be rectangular, for example. The reason for setting the no-passing region R is to prevent a collision between the oncoming vehicle 51 and the host vehicle 50 when the oncoming vehicle 51 passes the host vehicle 50 while avoiding the parked vehicle 52. The parked vehicle 52 in this case is thus present in the no-passing region R.

After the no-passing region R is set by the no-passing region setting unit 23, the passing position calculation unit 24 determines whether the position at which the host vehicle 50 and the oncoming vehicle 51 pass each other is present within the no-passing region R. In particular, as illustrated in FIG. 2, the passing position calculation unit 24 calculates a position P1 at which the host vehicle 50 and the oncoming vehicle 51 pass each other in accordance with a relative distance L between the host vehicle 50 and the oncoming vehicle 51 (a distance from the position of the host vehicle 50 when defined as the origin), a velocity V1 of the host vehicle 50, and a velocity V2 of the oncoming vehicle 51. The passing position P1 is calculated by the following equation:

$P1=L/(1+V2/V1)$

The passing position calculation unit 24 determines whether the calculated passing position P1 is present within the no-passing region R. FIG. 2 illustrates the case in which the passing position P1 is present within the no-passing region R.

When the passing position calculation unit 24 determines that the passing position P1 is present within the no-passing region R, the velocity determination unit 25 estimates an intention of the driver of the oncoming vehicle 51 so as to determine a velocity of the host vehicle 50. In the situation illustrated in FIG. 2, two cases are presumed as the intention of the driver of the oncoming vehicle 51. One of the intentions is a case in which the oncoming vehicle 51 passes by the parked vehicle 52 before the host vehicle 50 passes the parked vehicle 51, and the other is a case in which the oncoming vehicle 51 passes by the parked vehicle 52 after the host vehicle 50 passes the parked vehicle 52. Namely, the intention of the driver of the oncoming vehicle 51 to be determined is whether the oncoming vehicle 51 waits for the host vehicle 50 to pass the parked vehicle 52 or not.

The reason for estimating the intention of the driver of the oncoming vehicle 51 is that the host vehicle 50 can avoid sudden braking or unnecessary acceleration or deceleration when the velocity of the host vehicle 50 is determined in accordance with the estimation of the intention of the driver of the oncoming vehicle 51. For example, when the intention of the driver of the oncoming vehicle 51 is to wait for the host vehicle 50 to pass, the host vehicle 50 can be led to keep the velocity or accelerate so as to pass the parked vehicle 52. When the intention of the driver of the oncoming vehicle 51 is to pass by the parked vehicle 52 without waiting for the host vehicle 50, the host vehicle 50 can be led to decelerate so as to smoothly stop at a position (on the outside of the no-passing region R) at which the host vehicle 50 can prevent a collision with the oncoming vehicle 51 that could project toward the traveling lane so as to avoid the parked vehicle 52.

If the intention of the driver of the oncoming vehicle 51 is not estimated, the host vehicle 50 may be caused to make sudden braking or unnecessary acceleration or deceleration. For example, when a blocked area caused by the parked vehicle 52 is large, or when there is a pedestrian crossing around the parked vehicle 52, the oncoming vehicle 51 would accelerate to pass by the parked vehicle 52 after briefly decelerating or making a stop for safety. In such a case, the host vehicle 50 first starts accelerating, since the passing position P1 is temporarily shifted toward the oncoming vehicle 51 due to the deceleration of the oncoming vehicle 51. The host vehicle 50, however, soon needs to decelerate because the oncoming vehicle 51 again accelerates and the passing position P1 is then shifted toward the host vehicle 50. In the case in which the oncoming vehicle 51 passes by the parked vehicle 52 before the host vehicle 50, which includes the case in which the oncoming vehicle 51 first decelerates and then starts accelerating to pass by the parked vehicle 52, the acceleration/deceleration control for the host vehicle 50 is inevitably switched if the intention of the driver of the oncoming vehicle 51 is not estimated, which may cause the host vehicle 50 to make sudden braking or unnecessary acceleration or deceleration. The first embodiment estimates the intention of the driver of the oncoming vehicle 51 to determine the velocity of the host vehicle 50, so as to avoid sudden braking or unnecessary acceleration or deceleration.

Next, an example of a method of estimating the intention of the driver of the oncoming vehicle 51 and an example of a method of determining the velocity of the host vehicle 50 in accordance with the estimated intention are described below, with reference to FIG. 3A and FIG. 3B. The estimation method and the determination method are illustrated on the presumption that the passing position P1 is present within the no-passing region R.

Figure 3A:
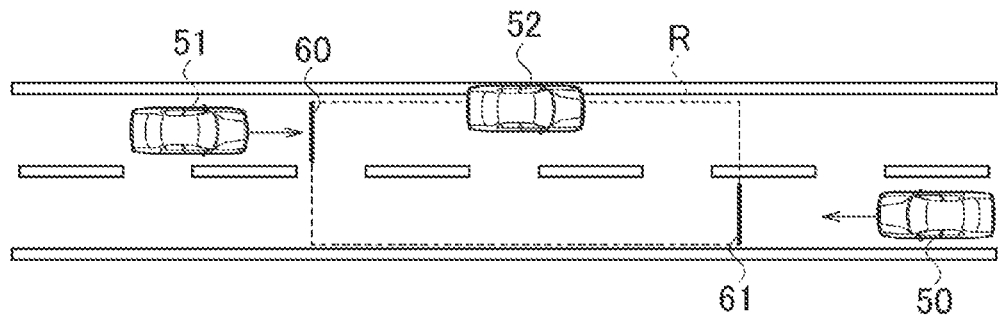
FIG. 3A is a view explaining an example of a velocity determination method according to the first embodiment of the present invention.

As illustrated in FIG. 3A, when the position of the oncoming vehicle 51 is located behind the switch line 60 in the traveling direction of the host vehicle 50 (located forward of the switch line 60 in the traveling direction of the host vehicle 50) as viewed from the host vehicle 50, and when the velocity of the oncoming vehicle 51 is a predetermined velocity or greater, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50.

When the position of the oncoming vehicle 51 is located behind the switch line 60 as viewed from the host vehicle 50, and when the velocity of the oncoming vehicle 51 is less than the predetermined velocity, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the current velocity or accelerate so as to lead the host vehicle 50 to pass the parked vehicle 52 before the oncoming vehicle 51.

Figure 3B:
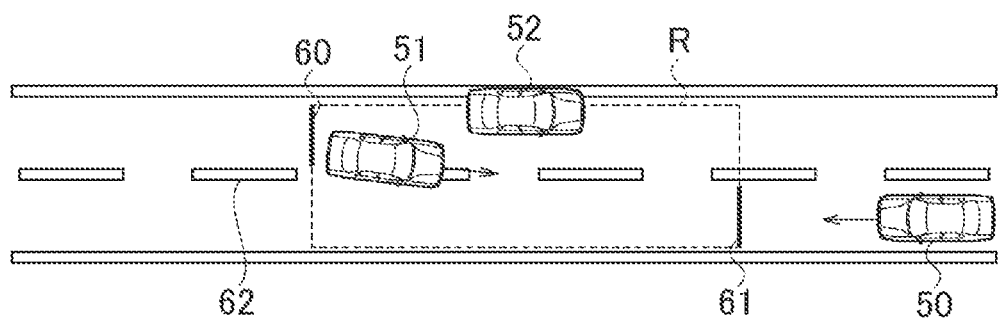
FIG. 3B is a view explaining the example of the velocity determination method according to the first embodiment of the present invention.

As illustrated in FIG. 3B, when the position of the oncoming vehicle 51 is located in front of the switch line 60 in the traveling direction of the host vehicle 50 (located at the back of the switch line 60 in the traveling direction of the host vehicle 50) as viewed from the host vehicle 50, and when the velocity of the oncoming vehicle 51 is increased, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50.

When the position of the oncoming vehicle 51 is located in front of the switch line 60 as viewed from the host vehicle 50, and when the oncoming vehicle 51 is coming close to a boundary line 62 indicating a boundary between the traveling lane and the oncoming lane, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50.

When the position of the oncoming vehicle 51 is located in front of the switch line 60 as viewed from the host vehicle 50, and when the velocity of the oncoming vehicle 51 is not increased, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the current velocity or accelerate so as to lead the host vehicle 50 to pass the parked vehicle 52 before the oncoming vehicle 51.

When the position of the oncoming vehicle 51 is located in front of the switch line 60 as viewed from the host vehicle 50, and when the oncoming vehicle 51 does not come close to the boundary line 62, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the current velocity or accelerate so as to lead the host vehicle 50 to pass the parked vehicle 52 before the oncoming vehicle 51.

The phrase "the oncoming vehicle 51 is coming close to the boundary line 62" refers to a state in which the position of the oncoming vehicle 51 in the road width direction is closer to the boundary line 62 than the position when passing through the switch line 60, for example. The phrase "the oncoming vehicle 51 does not come close to the boundary line 62" refers to a state in which the position of the oncoming vehicle 51 in the road width direction is the same as the position when passing through the switch line 60, for example.

When the position of the oncoming vehicle 51 is located in front of the switch line 60 as viewed from the host vehicle 50, and when the distance between the boundary line 62 and the oncoming vehicle 51 is a predetermined distance or less, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50. The predetermined distance as used herein is set to a distance in which the oncoming vehicle 51 is presumed to shortly drive over the boundary line 62, for example.

When the position of the oncoming vehicle 51 is located in front of the switch line 60 as viewed from the host vehicle 50, and when the distance between the boundary line 62 and the oncoming vehicle 51 is greater than the predetermined distance (a third predetermined distance), the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the velocity so as to lead the host vehicle 50 to pass the parked vehicle 52 before the oncoming vehicle 51. When the distance between the boundary line 62 and the oncoming vehicle 51 does not fall below the predetermined distance within a predetermined time, the velocity determination unit 25 determines to cause the host vehicle 50 to accelerate. The predetermined time as used herein is set to a time necessary for estimating the intention of the driver of the oncoming vehicle 51, for example.

The velocity determination unit 25 may determine the velocity of the host vehicle 50 based on the acceleration rate of the oncoming vehicle 51. For example, when the position of the oncoming vehicle 51 is located in front of the switch line 60 as viewed from the host vehicle 50, and when the acceleration rate of the oncoming vehicle 51 is a predetermined acceleration rate or greater, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50. The predetermined acceleration rate as used herein is set to an acceleration rate at which the oncoming vehicle 51 is presumed to shortly drive over the boundary line 62, for example.

When the position of the oncoming vehicle 51 is located in front of the switch line 60 as viewed from the host vehicle 50, and when the acceleration rate of the oncoming vehicle 51 is less than the predetermined acceleration rate, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the velocity so as to lead the host vehicle 50 to pass the parked vehicle 52 before the oncoming vehicle 51. When the acceleration rate of the oncoming vehicle 51 does not reach the predetermined acceleration rate within the predetermined time, the velocity determination unit 25 determines to cause the host vehicle 50 to accelerate.

The phrase "the position of the oncoming vehicle 51 is located behind the switch line 60 as viewed from the host vehicle 50" as used in the first embodiment refers to a case in which the oncoming vehicle 51 is located forward of the switch line 60 in the direction opposite to the traveling direction of the oncoming vehicle 51. The phrase "the position of the oncoming vehicle 51 is located behind the switch line 60 as viewed from the host vehicle 50" may also be referred to as a state in which the position of the oncoming vehicle 51 is located on the outside of the no-passing region R.

The phrase "the position of the oncoming vehicle 51 is located in front of the switch line 60 as viewed from the host vehicle 50" as used in the first embodiment refers to a case in which the oncoming vehicle 51 is located forward of the switch line 60 in the traveling direction of the oncoming vehicle 51. The phrase "the position of the oncoming vehicle 51 is located in front of the switch line 60 as viewed from the host vehicle 50" may also be referred to as a state in which the position of the oncoming vehicle 51 is located on the inside of the no-passing region R.

After the velocity of the host vehicle 50 is determined by the velocity determination unit 25, the vehicle control unit 26 controls the respective actuators 30 so as to cause the host vehicle 50 to travel at the determined velocity. In particular, the vehicle control unit 26 decelerates the host vehicle 50 at the deceleration rate determined by the velocity determination unit 25 so as to lead the host vehicle 50 to smoothly stop at the stop line 61. The vehicle control unit 26 also accelerates the host vehicle 50 at the acceleration rate determined by the velocity determination unit 25. The vehicle control unit 26 in this case gradually accelerates the host vehicle 50 so that the passing position P1 is shifted to the outside of the no-passing region R. The vehicle control device 1 according to the first embodiment estimates the intention of the driver of the oncoming vehicle 51, and determines the velocity of the host vehicle 50 in accordance with the estimated intention, so as to avoid sudden braking or unnecessary acceleration or deceleration.

Figure 3C:
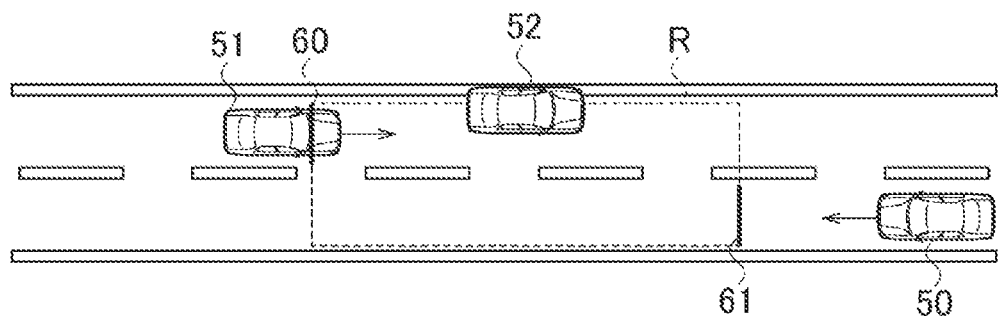
FIG. 3C is a view explaining the example of the velocity determination method according to the first embodiment of the present invention.

While FIG. 3A illustrates the example in which the position of the oncoming vehicle 51 is located behind the switch line 60 as viewed from the host vehicle 50, and FIG. 3B illustrates the example in which the position of the oncoming vehicle 51 is located in front of the switch line 60 as viewed from the host vehicle 50, the determination of whether the position of the oncoming vehicle 51 is located behind or in front of the switch line 60 as viewed from the host vehicle 50 is not limited to the cases illustrated in FIG. 3A and FIG. 3B. For example, as illustrated in FIG. 3C, when the oncoming vehicle 51 overlaps with the switch line 60, the position of the oncoming vehicle 51 may be determined to be located either behind the switch line 60 or in front of the switch line 60 as viewed from the host vehicle 50. Alternatively, when the middle of the entire length of the oncoming vehicle 51 is located behind the switch line 60 as viewed from the host vehicle 50, the position of the oncoming vehicle 51 may be determined to be located behind the switch line 60. Similarly, when the middle of the entire length of the oncoming vehicle 51 is located in front of the switch line 60 as viewed from the host vehicle 50, the position of the oncoming vehicle 51 may be determined to be located in front of the switch line 60.

Figure 4:
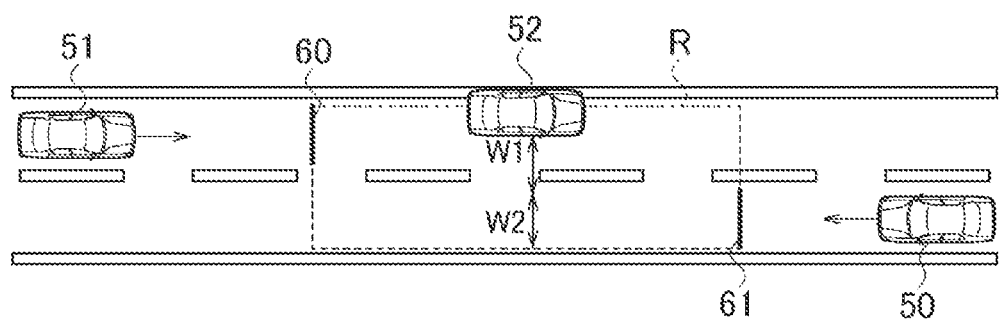
FIG. 4 is a view explaining a case of passing in a narrow road according to the first embodiment of the present invention.

The cases illustrated above are each presumed as a situation in which the host vehicle 50 and the oncoming vehicle 51 cannot pass the parked vehicle 52 simultaneously, or a situation in which the host vehicle 50 and the oncoming vehicle 51 could pass the parked vehicle 52 simultaneously but should avoid the simultaneous passing because there is still a probability of collision therebetween. The host vehicle 50 and the oncoming vehicle 51 could safely pass the parked vehicle 52 simultaneously depending on the road width, the vehicle width of the parked vehicle 52, the vehicle width of the host vehicle 50, and the vehicle width of the oncoming vehicle 51. The conditions for enabling the host vehicle 50 and the oncoming vehicle 51 to safely pass the parked vehicle 52 simultaneously are the spaces sufficient to avoid a collision between the oncoming vehicle 51 and the parked vehicle 52 and a collision between the host vehicle 50 and the oncoming vehicle 51. This point is described in detail below with reference to FIG. 4. The sensor 11 detects a width W1 in which the oncoming vehicle 51 can keep traveling while avoiding the parked vehicle 52, as illustrated in FIG. 4. The width W1 can be obtained such that the vehicle width of the oncoming vehicle 51 is added to the space sufficient to avoid a collision between the oncoming vehicle 51 and the parked vehicle 52. The sensor 11 then detects a remaining lane width W2 obtained such that the vehicle width of the parked vehicle 52 (the vehicle width overlapping with the road) and the width W1 are subtracted from the entire road width. The passing position calculation unit 24 determines whether the remaining lane width W2 is sufficient to avoid a collision between the host vehicle 50 and the oncoming vehicle 51 when passing each other. When the remaining lane width W2 is sufficient to avoid a collision between the host vehicle 50 and the oncoming vehicle 51 when passing each other, the host vehicle 50 and the oncoming vehicle 51 each can decelerate so as to pass each other in the narrow road.

The explanations are made above with the example in which the switch line setting unit 21 sets the virtual switch line 60 extending in the lane width direction in the oncoming lane at the position distant from the parked vehicle 52 by the predetermined distance in the traveling direction of the host vehicle 50. The method of setting the switch line 60 is not limited to the case described above. For example, the switch line setting unit 21 may set the switch line 60 by use of a velocity profile. The method of setting the switch line 60 by use of the velocity profile is described below with reference to FIG. 5. The term "velocity profile" as used herein refers to time-series data of velocities.

Figure 5:
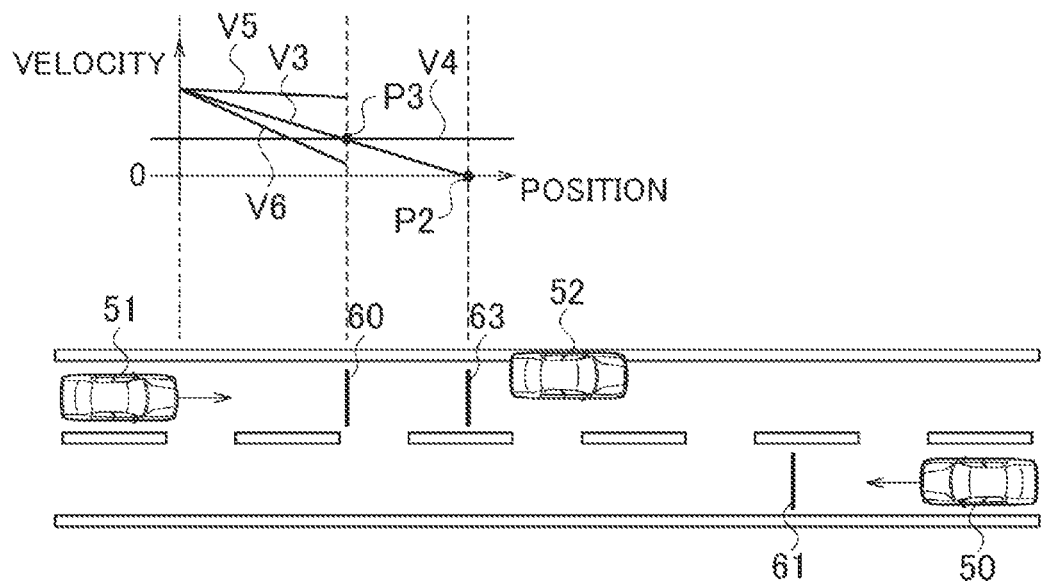
FIG. 5 is a view explaining another example of the method of setting the switch line according to the first embodiment of the present invention.

As illustrated in FIG. 5, the switch line setting unit 21 sets a second stop line 63 before setting the switch line 60.

The second stop line 63 is located at a position at which the oncoming vehicle 51 is presumed to stop in front of the parked vehicle 52. The second stop line 63 is set at a position allowing the oncoming vehicle 51 in the stopped state to start avoiding and passing by the parked vehicle 52. The oncoming vehicle 51 should stop at a position distant from the parked vehicle 52 to some extent so that the oncoming vehicle 51 in the stopped state can avoid and pass by the parked vehicle 52. Determining the position distant from the parked vehicle 52 at which the oncoming vehicle 51 should stop depends on the vehicle width and the parked position of the parked vehicle 52, for example. The second stop line 63 is preferably set at the position depending on the vehicle width and the parked position of the parked vehicle 52, but may be set at a position having a predetermined distance sufficient to avoid the parked vehicle 52.

After setting the second stop line 63, the switch line setting unit 21 generates a velocity profile V3 that leads the oncoming vehicle 51 to stop at the second stop line 63 after starting decelerating at a constant deceleration rate from the current position of the oncoming vehicle 51. The velocity profile V3 in the first embodiment is set on the presumption that the intention of the driver of the oncoming vehicle 51 is to wait for the host vehicle 50 to pass the parked vehicle 52. The switch line setting unit 21 sets the switch line 60 at a position P3 at which a velocity regarding the velocity profile V3 is a predetermined velocity V4. A position P2 illustrated in FIG. 5 is a position at which the second stop line 63 is set.

When the switch line 60 is set by use of the velocity profile V3, the velocity determination unit 25 determines the velocity of the host vehicle 50 based on the velocity profile V3. In particular, when the position of the oncoming vehicle 51 is located behind the switch line 60 as viewed from the host vehicle 50, the velocity determination unit 25 subtracts the velocity regarding the velocity profile V3 from the velocity of the oncoming vehicle 51 to calculate a velocity difference. The velocity determination unit 25 then determines the velocity of the host vehicle 50 in accordance with the calculated velocity difference. The velocity of the oncoming vehicle 51 located behind the switch line 60 as viewed from the host vehicle 50 is classified into the following three cases: the velocity of the oncoming vehicle 51 is greater than the velocity regarding the velocity profile V3, the velocity of the oncoming vehicle 51 is less than the velocity regarding the velocity profile V3, and the velocity of the oncoming vehicle 51 is substantially the same as the velocity regarding the velocity profile V3. A velocity V5 illustrated in FIG. 5 refers to the case in which the velocity of the oncoming vehicle 51 located behind the switch line 60 as viewed from the host vehicle 50 is greater than the velocity profile V3. A velocity V6 illustrated in FIG. 5 refers to the case in which the velocity of the oncoming vehicle 51 located behind the switch line 60 as viewed from the host vehicle 50 is less than the velocity profile V3. The reason that the velocity determination unit 25 calculates the velocity difference is to classify to determine whether the velocity of the oncoming vehicle 51 is greater than, is less than, or is substantially the same as the estimated velocity. The intention of the driver of the oncoming vehicle 51 is estimated in accordance with the result of the classification.

When the calculated velocity difference is a first predetermined value or greater, the velocity of the oncoming vehicle 51 is determined to be greater than the estimated velocity. In other words, the intention of the driver of the oncoming vehicle 51 is estimated to pass by the parked vehicle 52 without waiting for the host vehicle 50. The velocity determination unit 25 in this case thus determines the deceleration rate of the host vehicle 50 so as to smoothly stop at the stop line 61 in order to avoid a collision between the oncoming vehicle 51 and the host vehicle 50.

When the calculated velocity difference is less than a second predetermined value, the velocity of the oncoming vehicle 51 is determined to be less than the estimated velocity. In other words, the intention of the driver of the oncoming vehicle 51 is estimated to wait for the host vehicle 50 to pass the parked vehicle 52. The velocity determination unit 25 in this case thus determines to cause the host vehicle 50 to keep the current velocity or accelerate so as to lead the host vehicle 50 to pass the parked vehicle 52 before the oncoming vehicle 51.

When the calculated velocity difference is less than the first predetermined value and greater than or equal to the second predetermined value, the velocity of the oncoming vehicle 51 is determined to be substantially the same as the estimated velocity. In other words, the intention of the driver of the oncoming vehicle 51 is estimated to wait for the host vehicle 50 to pass the parked vehicle 52. The velocity determination unit 25 in this case thus determines to cause the host vehicle 50 to keep the current velocity or accelerate so as to lead the host vehicle 50 to pass the parked vehicle 52 before the oncoming vehicle 51.

The velocity difference described above refers to a difference calculated at a certain time. Since a velocity of a vehicle can vary, the comparison of the velocity difference at a certain time sometimes does not lead to an accurate result. In view of this, the velocity determination unit 25 can compare the velocity difference for a predetermined time. For example, as illustrated in FIG. 5, the velocity determination unit 25 estimates that the intention of the driver of the oncoming vehicle 51 is to pass by the parked vehicle 52 without waiting for the host vehicle 50 when the velocity of the oncoming vehicle 51 is constantly greater than the velocity regarding the velocity profile V3 (for example, the velocity V5) for a predetermined time. The velocity determination unit 25 in this case determines the deceleration rate of the host vehicle 50 so as to smoothly stop at the stop line 61 in order to avoid a collision between the oncoming vehicle 51 and the host vehicle 50. When the velocity of the oncoming vehicle 51 is constantly less than the velocity regarding the velocity profile V3 (for example, the velocity V6) for a predetermined time, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the current velocity or accelerate so as to lead the host vehicle 50 to pass the parked vehicle 52 before the oncoming vehicle 51.

The velocity calculation unit 25 may calculate an average of the velocities of the oncoming vehicle 51 for a predetermined time to use the calculated average for the comparison. In particular, the velocity determination unit 25 subtracts the velocity regarding the velocity profile V3 from the average of the velocities of the oncoming vehicle 51 to calculate a second velocity difference. The velocity determination unit 25 then determines the velocity of the host vehicle 50 in accordance with the calculated second velocity difference. When the calculated second velocity difference is a third predetermined value or greater, the velocity of the oncoming vehicle 51 is presumed to be greater than the estimated velocity. Namely, the intention of the driver of the oncoming vehicle 51 is estimated to pass by the parked vehicle 52 without waiting for the host vehicle 50. The velocity determination unit 25 in this case thus determines the deceleration rate of the host vehicle 50 so as to smoothly stop at the stop line 61 in order to avoid a collision between the oncoming vehicle 51 and the host vehicle 50. When the calculated second velocity difference is smaller than a fourth predetermined value, the velocity of the oncoming vehicle 51 is presumed to be less than the estimated velocity. Namely, the intention of the driver of the oncoming vehicle 51 is estimated to wait for the host vehicle 50 to pass the parked vehicle 52. The velocity determination unit 25 in this case thus determines to cause the host vehicle 50 to keep the current velocity or accelerate so as to lead the host vehicle 50 to pass the parked vehicle 52 before the oncoming vehicle 51. When the calculated second velocity difference is smaller than the third predetermined value and greater than or equal to the fourth predetermined value, the velocity of the oncoming vehicle 51 is presumed to be substantially the same as the estimated velocity. Namely, the intention of the driver of the oncoming vehicle 51 is estimated to wait for the host vehicle 50 to pass the parked vehicle 52. The velocity determination unit 25 in this case thus determines to cause the host vehicle 50 to keep the current velocity or accelerate so as to lead the host vehicle 50 to pass the parked vehicle 52 before the oncoming vehicle 51. Instead of the average value, a median or a mode may be used for the comparison.

Figure 6:
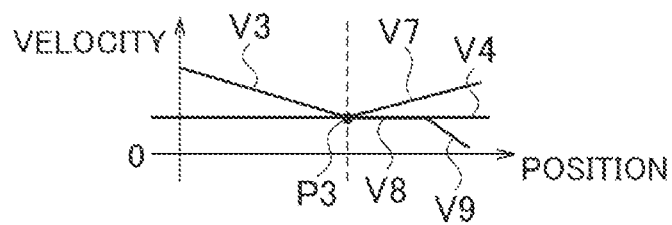
FIG. 6 is a view explaining another example of the velocity determination method according to the first embodiment of the present invention.

The explanations are made above with the example in which the velocity determination unit 25 estimates that the intention of the driver of the oncoming vehicle 51 is to pass by the parked vehicle 52 without waiting for the host vehicle 50 when the position of the oncoming vehicle 51 is in front of the switch line 60 as viewed from the host vehicle 50, and when the velocity of the oncoming vehicle 51 is increased. The phrase "the velocity of the oncoming vehicle 51 is increased" in this case refers to a state in which the velocity of the oncoming vehicle 51 is increased more than the predetermined velocity V4, such as a velocity V7 as illustrated in FIG. 6, for example.

The explanations are also made above with the example in which the velocity determination unit 25 estimates that the intention of the driver of the oncoming vehicle 51 is to wait for the host vehicle 50 to pass the parked vehicle 52 when the position of the oncoming vehicle 51 is in front of the switch line 60 as viewed from the host vehicle 50, and when the velocity of the oncoming vehicle 51 is not increased. The phrase "the velocity of the oncoming vehicle 51 is not increased" in this case refers to a case in which the velocity of the oncoming vehicle 51 is the same as the predetermined velocity V4, such as a velocity V8 as illustrated in FIG. 6, for example. The phrase "the velocity of the oncoming vehicle 51 is not increased" also refers to a state in which the velocity of the oncoming vehicle 51 is decreased to fall below the velocity V4, such as a velocity V9 as illustrated in FIG. 6, for example.

The velocity profile V3 described above is generated by the switch line setting unit 21, but is not limited to the case of being generated. For example, velocity profile models acquired from data of multiple drivers may be preliminarily prepared to obtain a corresponding velocity profile model. The term "data of multiple drivers" includes the data of the velocity of the oncoming vehicle 51 in the situation as illustrated in FIG. 2, for example. An appropriate velocity profile model is chosen from the prepared plural velocity profile models depending on the position and the velocity of the oncoming vehicle 51.

Figure 8:
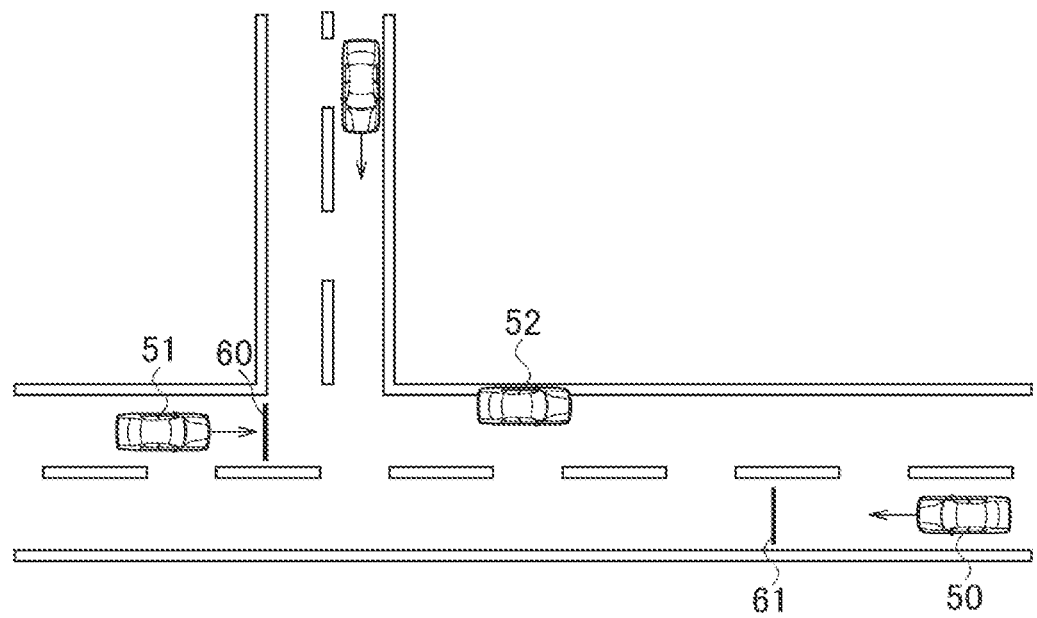
FIG. 8 is a view explaining still another example of the method of setting the switch line according to the first embodiment of the present invention.
Figure 9:
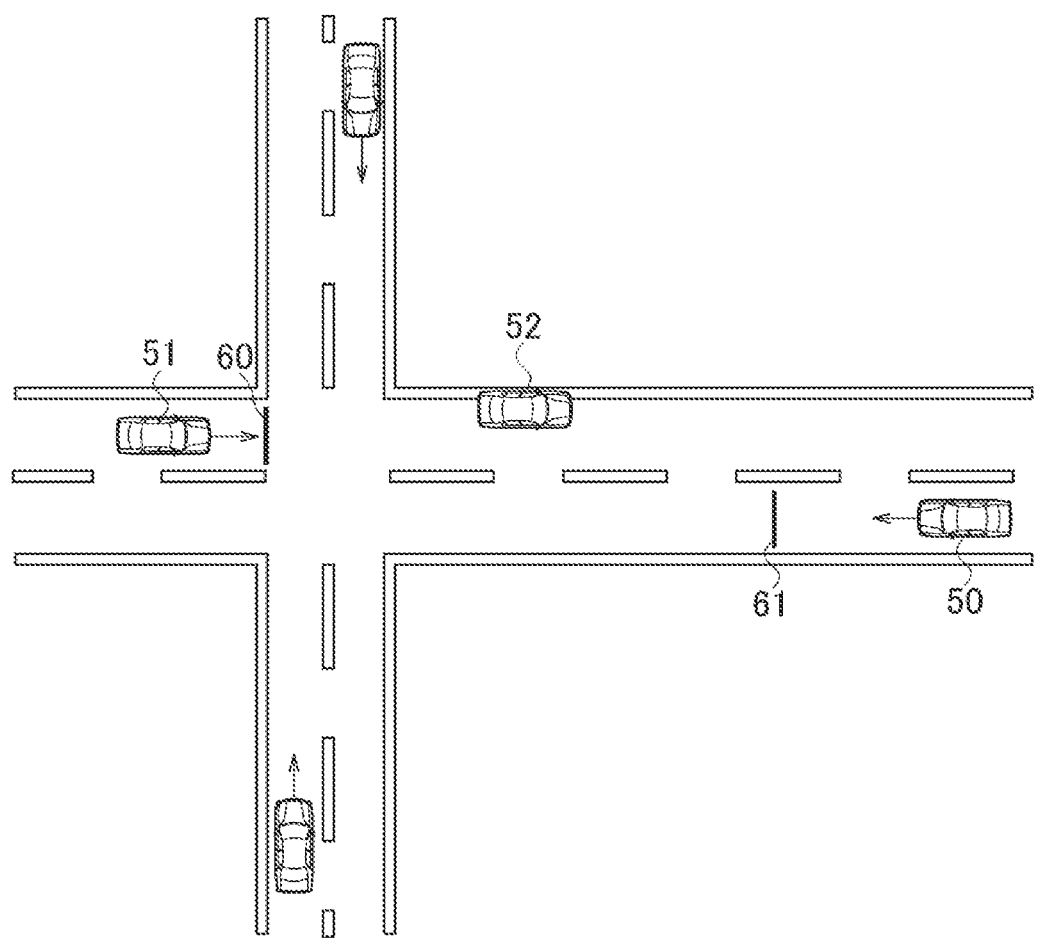
FIG. 9 is a view explaining still another example of the method of setting the switch line according to the first embodiment of the present invention.

Another example of setting the switch line 60 is described below with reference to FIG. 7 to FIG. 9.

Figure 7:
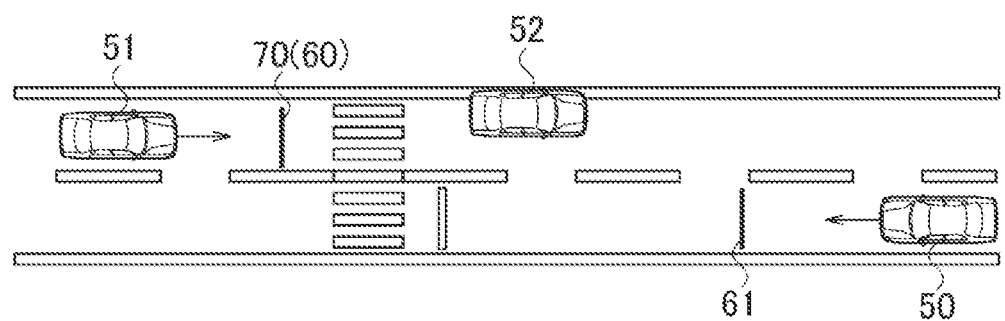
FIG. 7 is a view explaining still another example of the method of setting the switch line according to the first embodiment of the present invention.

As illustrated in FIG. 7, when a pedestrian crossing including a stop line 70 is present ahead of the oncoming vehicle 51 and behind the parked vehicle 52, the switch line setting unit 21 may set the switch line 60 so as to overlap with the stop line 70 at the pedestrian crossing. Namely, the switch line setting unit 21 may set the switch line 60 at a position corresponding to the stop line 70 at the pedestrian crossing.

When a point at which two or more roads intersect with each other is present ahead of the oncoming vehicle 51 and behind the parked vehicle 52, the switch line setting unit 21 may set the switch line 60 immediately in front of a position at which the oncoming vehicle 51 enters the intersecting point. In particular, as illustrated in FIG. 8, when there is a junction of three roads ahead of the oncoming vehicle 51 and behind the parked vehicle 52, the switch line setting unit 21 may set the switch line 60 immediately in front of a position at which the oncoming vehicle 51 enters the junction of the three roads. Alternatively, as illustrated in FIG. 9, when an intersection is present ahead of the oncoming vehicle 51 and behind the parked vehicle 52, the switch line setting unit 21 may set the switch line 60 immediately in front of a position at which the oncoming vehicle 51 enters the intersection. The term "junction of three roads" or "intersection" refers to a position at which two or more roads intersect with reach other. The junction of three roads includes a T-junction and a Y-junction.

Figure 10:
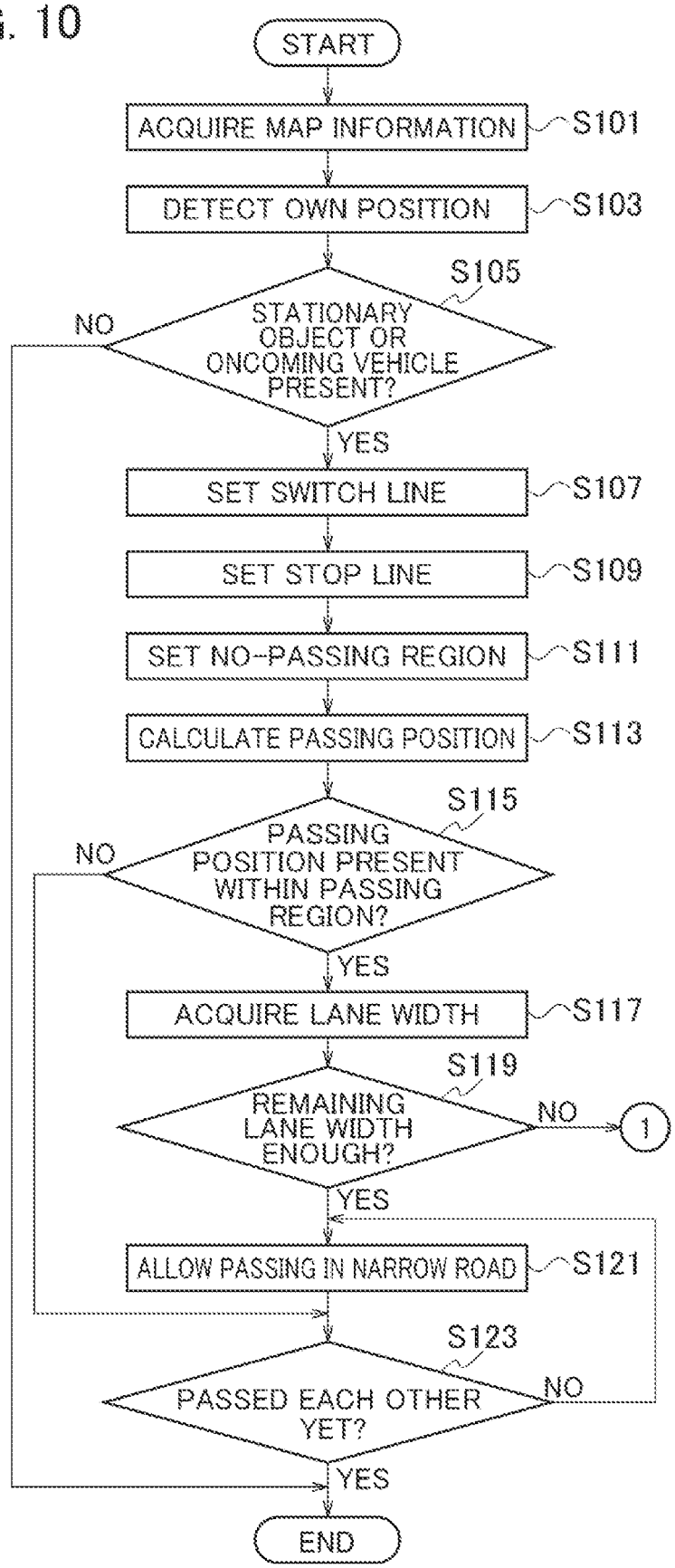
FIG. 10 is a flowchart explaining an example of operation of the vehicle control device according to the first embodiment of the present invention.
Figure 11:
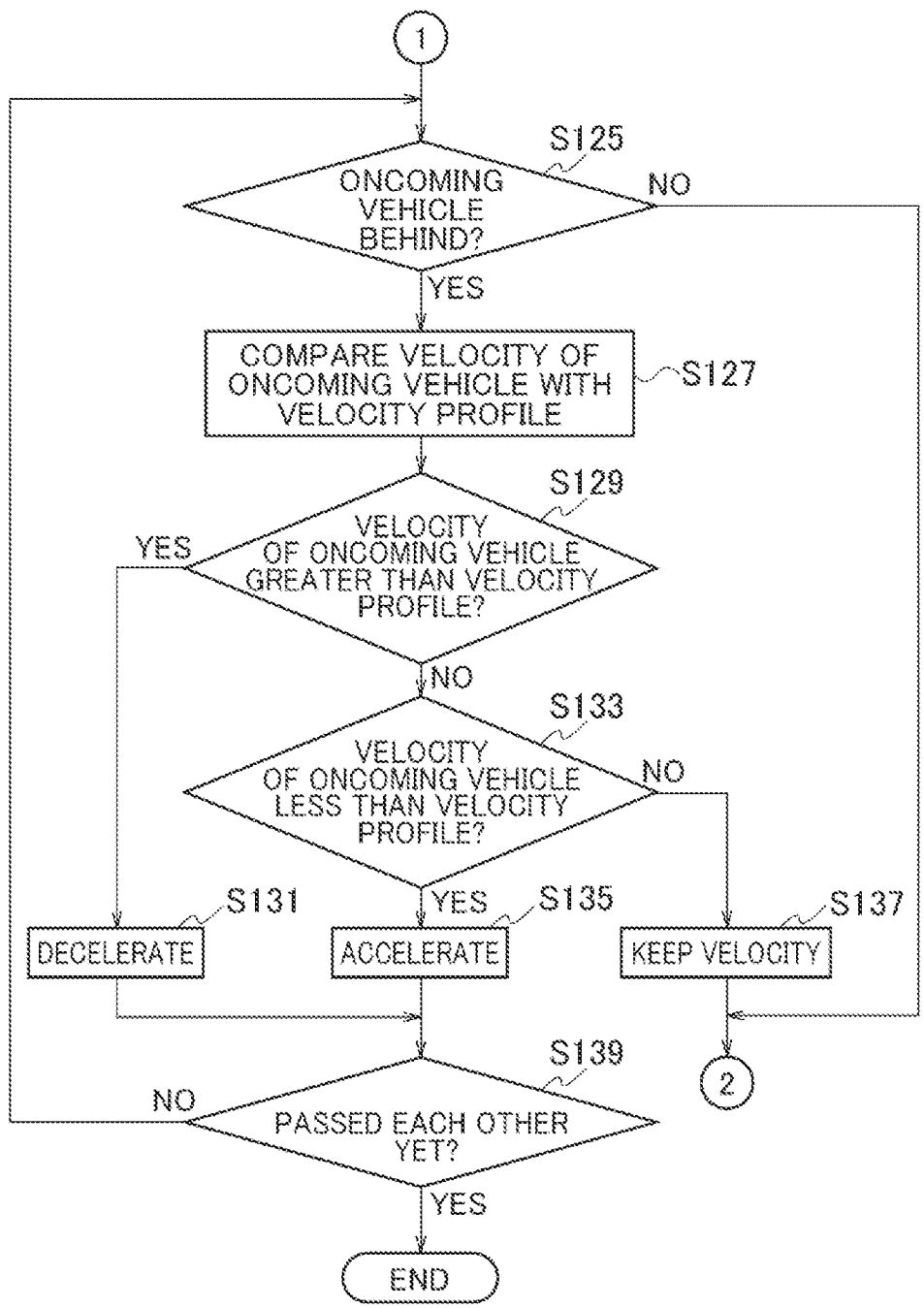
FIG. 11 is a flowchart explaining the example of operation of the vehicle control device according to the first embodiment of the present invention.
Figure 12:
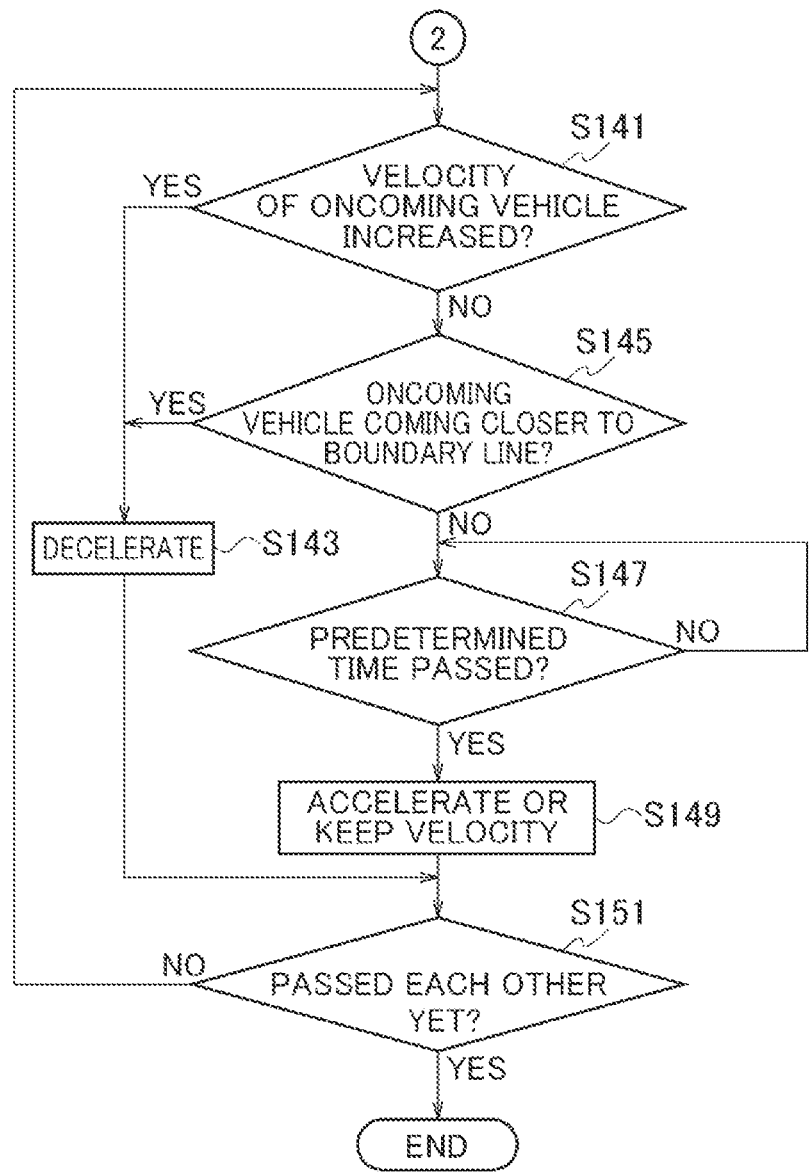
FIG. 12 is a flowchart explaining the example of operation of the vehicle control device according to the first embodiment of the present invention.

An example of operation of the vehicle control device 1 is described below with reference to the flowcharts shown in FIG. 10 to FIG. 12. The process described below is repeated on a predetermined cycle.

In step S101, the controller 20 acquires the map information from the map database 12. The process proceeds to step S103, and the position detection sensors such as the GPS receiver 10 and the odometry detect the positional information of the host vehicle 50.

When the parked vehicle 52 and the oncoming vehicle 51 are detected by the sensor 11 (YES in step S105), the process proceeds to step S107. When either the parked vehicle 52 or the oncoming vehicle 51 is not detected (NO in step S105), the series of processing ends.

In step S107, the switch line setting unit 21 sets the virtual switch line 60 extending in the lane width direction in the oncoming lane at a position distant from the parked vehicle 52 by a predetermined distance in the traveling direction of the host vehicle 50 (refer to FIG. 2). The switch line setting unit 21 may set the switch line 60 by use of the velocity profile V3 (refer to FIG. 5). The process proceeds to step S109, and the stop line setting unit 22 sets the virtual stop line 61 extending in the lane width direction in the traveling lane at a position distant from the parked vehicle 52 by a predetermined distance in the traveling direction of the oncoming vehicle 51 (refer to FIG. 2).

The process proceeds to step S111, and the no-passing region setting unit 23 sets the no-passing region R by use of the switch line 60 and the stop line 61 set in step S107 and S109 (refer to FIG. 2). The process proceeds to step S113, and the passing position calculation unit 24 determines whether the position P1 at which the host vehicle 50 and the oncoming vehicle 51 pass each other is present within the no-passing region R set in step S111.

When the position P1 at which the host vehicle 50 and the oncoming vehicle 51 pass each other is present within the no-passing region R (YES in step S115), the process proceeds to step S117. When the position P1 at which the host vehicle 50 and the oncoming vehicle 51 pass each other is not present within the no-passing region R (NO in step S115), the process proceeds to step S123.

In step S117, the sensor 11 detects the width W1 in which the oncoming vehicle 51 can keep traveling while avoiding the parked vehicle 52 (refer to FIG. 4). The sensor 11 then detects the remaining lane width W2 obtained such that the vehicle width of the parked vehicle 52 and the width W1 are subtracted from the entire road width (refer to FIG. 4). The process proceeds to step S119, and the passing position calculation unit 24 determines whether the remaining lane width W2 detected in step S117 is sufficient to avoid a collision between the host vehicle 50 and the oncoming vehicle 51 when passing each other (in step S119). When the result of the determination is YES in step S119, the process proceeds to step S121, and the host vehicle 50 is caused to keep traveling to pass the oncoming vehicle 51 in the narrow road. When the host vehicle 50 and the oncoming vehicle 51 have passed each other (YES in step S123), the series of processing ends. When the result of the determination is NO in step S119, the process proceeds to step S125.

When the position of the oncoming vehicle 51 is located behind the switch line 60 as viewed from the host vehicle 50 (YES in step S125) (refer to FIG. 3A), the process proceeds to step S127. In step S127, the velocity determination unit 25 subtracts the velocity regarding the velocity profile V3 from the velocity of the oncoming vehicle 51 to calculate the velocity difference. The velocity determination unit 25 classifies to determine whether the velocity of the oncoming vehicle 51 is greater than, is less than, or is substantially the same as the estimated velocity in accordance with the velocity difference. When the velocity of the oncoming vehicle 51 is greater than the velocity regarding the velocity profile V3 (YES in step S129), the process proceeds to step S131, and the velocity determination unit 25 estimates that the intention of the driver of the oncoming vehicle 51 is to pass by the parked vehicle 52 without waiting for the host vehicle 50. The velocity determination unit 25 then determines the deceleration rate of the host vehicle 50 so as to smoothly stop at the stop line 61 in order to avoid a collision between the oncoming vehicle 51 and the host vehicle 50. The vehicle control unit 26 decelerates the host vehicle 50 by use of the brake actuator at the deceleration rate determined by the velocity determination unit 25. The process then proceeds to step S139.

When the velocity of the oncoming vehicle 51 is not greater than the velocity regarding the velocity profile V3 (NO in step S129), the process proceeds to step S133. When the velocity of the oncoming vehicle 51 is less than the velocity regarding the velocity profile V3 (YES in step S133), the process proceeds to step S135, and the velocity determination unit 25 estimates that the intention of the driver of the oncoming vehicle 51 is to wait for the host vehicle 50 to pass the parked vehicle 52. The velocity determination unit 25 then determines to cause the host vehicle 50 to accelerate so as to lead the host vehicle 50 to pass the parked vehicle 52 before the oncoming vehicle 51. The vehicle control unit 26 accelerates the host vehicle 50 by use of the acceleration actuator. The process then proceeds to step S139. The processing in step S139 is the same as that in step S123, and overlapping explanations are not repeated below.

When the velocity of the oncoming vehicle 51 is the same or substantially the same as the velocity regarding the velocity profile V3 (NO in step S133), the process proceeds to step S137, and the velocity determination unit 25 estimates that the intention of the driver of the oncoming vehicle 51 is to wait for the host vehicle 50 to pass the parked vehicle 52. The velocity determination unit 25 then determines to cause the host vehicle 50 to keep the velocity so as to lead the host vehicle 50 to pass the parked vehicle 52 before the oncoming vehicle 51. The process then proceeds to step S141. When the position of the oncoming vehicle 51 is located in front of the switch line 60 as viewed from the host vehicle 50 (NO in step S125) (refer to FIG. 3B), the process also proceeds to step S141. The process may proceed to step S139 after the processing in step S137.

When the position of the oncoming vehicle 51 is located in front of the switch line 60 as viewed from the host vehicle 50, and when the velocity of the oncoming vehicle 51 is increased (YES in step S141), the process proceeds to step S143, and the velocity determination unit 25 estimates that the intention of the driver of the oncoming vehicle 51 is to pass by the parked vehicle 52 without waiting for the host vehicle 50. The velocity determination unit 25 then determines the deceleration rate of the host vehicle 50 so as to smoothly stop at the stop line 61 in order to avoid a collision between the oncoming vehicle 51 and the host vehicle 50. The vehicle control unit 26 decelerates the host vehicle 50 by use of the brake actuator at the deceleration rate determined by the velocity determination unit 25. The process then proceeds to step S151.

When the position of the oncoming vehicle 51 is located in front of the switch line 60 as viewed from the host vehicle 50, and when the velocity of the oncoming vehicle 51 is not increased (NO in step S141), the process proceeds to step S145. When the position of the oncoming vehicle 51 is located in front of the switch line 60 as viewed from the host vehicle 50, and when the oncoming vehicle 51 is coming close to the boundary line 62 indicating the boundary between the traveling lane and the oncoming lane (YES in step S145), the process proceeds to step S143. When the position of the oncoming vehicle 51 is located in front of the switch line 60 as viewed from the host vehicle 50, and when the oncoming vehicle 51 does not come close to the boundary line 62 (NO in step S145), the velocity determination unit 25 estimates that the intention of the driver of the oncoming vehicle 51 is to wait for the host vehicle 50 to pass the parked vehicle 52. After a lapse of predetermined time period (YES in step S147), the velocity determination unit 25 then determines to cause the host vehicle 50 to keep the current velocity or accelerate so as to lead the host vehicle 50 to pass the parked vehicle 52 before the oncoming vehicle 51 (in step S149). The reason for executing the processing in step S147 is to confirm that the estimated intention of the driver of the oncoming vehicle 51 is not changed. After the processing in step S149, the process proceeds to step S151. The processing in step S151 is the same as that in step S123, and overlapping explanations are not repeated below.

<Operational Effects>

As described above, the vehicle control device 1 according to the first embodiment can achieve the following operational effects.

The switch line setting unit 21 sets the virtual switch line 60 extending in the lane width direction in the oncoming lane at a position distant from the parked vehicle 52 by a predetermined distance in the traveling direction of the host vehicle 50. The stop line setting unit 22 sets the virtual stop line 61 in the traveling lane at a position distant from the parked vehicle 52 by a predetermined distance in the traveling direction of the oncoming vehicle 51. The no-passing region setting unit 23 sets the no-passing region R including the switch line 60 and the stop line 61 on the road. The passing position calculation unit 24 calculates the position P1 at which the host vehicle 50 and the oncoming vehicle 51 pass each other in accordance with the velocity of the host vehicle 50 and the position and the velocity of the oncoming vehicle 51. In the case in which the passing position P1 is present within the no-passing region R, when the position of the oncoming vehicle 51 is located behind the switch line 60 in the traveling direction of the host vehicle 50 as viewed from the host vehicle 50, and the velocity of the oncoming vehicle 51 is the predetermined velocity or greater, or when the position of the oncoming vehicle 51 is located in front of the switch line 60 in the traveling direction of the host vehicle 50 as viewed from the host vehicle 50, and the velocity of the oncoming vehicle 51 is increased, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50.

In the case in which the passing position P1 is present within the no-passing region R, when the position of the oncoming vehicle 51 is located behind the switch line 60 in the traveling direction of the host vehicle 50 as viewed from the host vehicle 50, and the velocity of the oncoming vehicle 51 is less than the predetermined velocity, or when the position of the oncoming vehicle 51 is located in front the switch line 60 in the traveling direction of the host vehicle 50 as viewed from the host vehicle 50, and the velocity of the oncoming vehicle 51 is not increased, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the current velocity or accelerate so as to lead the host vehicle 50 to pass the parked vehicle 52 before the oncoming vehicle 51. The vehicle control unit 26 controls the respective actuators 30 so as to lead the host vehicle 50 to travel at the determined velocity. The vehicle control device 1 according to the first embodiment as described above estimates the intention of the driver of the oncoming vehicle 51, and determines the velocity of the host vehicle 50 in accordance with the estimated intention, so as to avoid sudden braking or unnecessary acceleration or deceleration.

When the position of the oncoming vehicle 51 is located behind the switch line 60 in the traveling direction of the host vehicle 50 as viewed from the host vehicle 50, and the velocity of the oncoming vehicle 51 is the predetermined velocity or greater, or when the position of the oncoming vehicle 51 is located in front of the switch line 60 in the traveling direction of the host vehicle 50 as viewed from the host vehicle 50, and the velocity of the oncoming vehicle 51 is increased, the vehicle control unit 26 causes the host vehicle 50 to decelerate so as to stop at the stop line 61. This control can avoid preventing the oncoming vehicle 51 from passing the parked vehicle 52, so as to ensure the smooth traveling.

The switch line setting unit 21 may set the switch line 60 based on a position at which the oncoming vehicle 51 can stop. The position at which the oncoming vehicle 51 can stop is the stop line 70 at the pedestrian crossing (the actual stop line), as illustrated in FIG. 7, for example. Alternatively, the position at which the oncoming vehicle 51 can stop is set immediately in front of the position at which the oncoming vehicle 51 enters the point at which two or more roads intersect with each other, as illustrated in FIG. 8 or FIG. 9, for example. Setting the switch line 60 as described above can execute the traveling control for the host vehicle 50 depending on the intention of the driver of the oncoming vehicle 51 that is to decelerate toward the switch line 60, to pass through the switch line 60, or to stop at the switch line 60.

The switch line setting unit 21 may set the switch line 60 in accordance with the velocity profile. When setting the switch line 60 by use of the velocity profile, the switch line setting unit 21 sets the virtual second stop line 63 in the oncoming lane at the position distant from the parked vehicle 52 by the predetermined distance (the second predetermined distance) in the traveling direction of the host vehicle 50. The switch line setting unit 21 acquires or generates the velocity profile V3 that leads the oncoming vehicle 51 to stop at the second stop line 63 by use of the position and the velocity of the oncoming vehicle 51. The switch line setting unit 21 then sets the switch line 60 at the position at which the velocity regarding the velocity profile V3 corresponds to the predetermined velocity V4 (the second predetermined velocity). The velocity determination unit 25 estimates the intention of the driver of the oncoming vehicle 51 by use of the switch line 60, and determines the velocity of the host vehicle 50 while taking account of the estimated intention. This configuration enables the control of the host vehicle 50 in accordance with the intention of the driver of the oncoming vehicle 51.

The velocity determination unit 25 subtracts the velocity regarding the velocity profile V3 from the velocity of the oncoming vehicle 51 to calculate the velocity difference, so as to classify to determine whether the velocity of the oncoming vehicle 51 is greater than, is less than, or is substantially the same as the estimated velocity, in accordance with the calculated velocity difference. This configuration enables the control of the host vehicle 50 in accordance with the intention of the driver of the oncoming vehicle 51, so as to avoid sudden braking or unnecessary acceleration or deceleration accordingly.

The velocity determination unit 25 may estimate the intention of the driver of the oncoming vehicle 51 in accordance with the positional relationship between the oncoming vehicle 51 and the boundary line 62 indicating the boundary between the traveling lane and the oncoming lane, or in accordance with the acceleration rate of the oncoming vehicle 51. This configuration enables the control of the host vehicle 50 in accordance with the intention of the driver of the oncoming vehicle 51, so as to avoid sudden braking or unnecessary acceleration or deceleration accordingly.

Modified Example

The first embodiment is illustrated above with the case of using the velocity and the acceleration rate of the oncoming vehicle 51 when determining the velocity of the host vehicle 50, but is not limited to this case. For example, the velocity determination unit 25 may determine the velocity of the host vehicle 50 only by use of the acceleration rate of the oncoming vehicle 51. In particular, in the case in which the passing position P1 is present within the no-passing region R, when the position of the oncoming vehicle 51 is located in front the switch line 60 in the traveling direction of the host vehicle 50 as viewed from the host vehicle 50, and when the velocity of the oncoming vehicle 51 is increased, the velocity determination unit 25 may estimate that the intention of the driver of the oncoming vehicle 51 is to pass by the parked vehicle 52 without waiting for the host vehicle 50. The velocity determination unit 25 in this case may determine the deceleration rate of the host vehicle 50 so as to smoothly stop at the stop line 61 in order to avoid a collision between the oncoming vehicle 51 and the host vehicle 50.

In the case in which the passing position P1 is present within the no-passing region R, when the position of the oncoming vehicle 51 is located in front of the switch line 60 in the traveling direction of the host vehicle 50 as viewed from the host vehicle 50, and when the velocity of the oncoming vehicle 51 is not increased, the velocity determination unit 25 may estimate that the intention of the driver of the oncoming vehicle 51 is to wait for the host vehicle 50 to pass the parked vehicle 52. The velocity determination unit 25 in this case may determine to cause the host vehicle 50 to keep the current velocity or accelerate so as to lead the host vehicle 50 to pass the parked vehicle 52 before the oncoming vehicle 51. The vehicle control device 1 according to the modified example as described above estimates the intention of the driver of the oncoming vehicle 51 only by use of the acceleration rate of the oncoming vehicle 51, so as to determine the velocity of the host vehicle 50 in accordance with the estimated intention. This can avoid sudden braking or unnecessary acceleration or deceleration.

Second Embodiment

A second embodiment of the present invention is described below with reference to FIG. 13 to FIG. 16. The same elements as described in the first embodiment are denoted by the same reference numerals, and overlapping explanations are not repeated below. The following explanations are made mainly with regard to the different points. The second embodiment is illustrated with the case in which the passing position P1 is presumed to be present within the no-passing region R.

Figure 13:
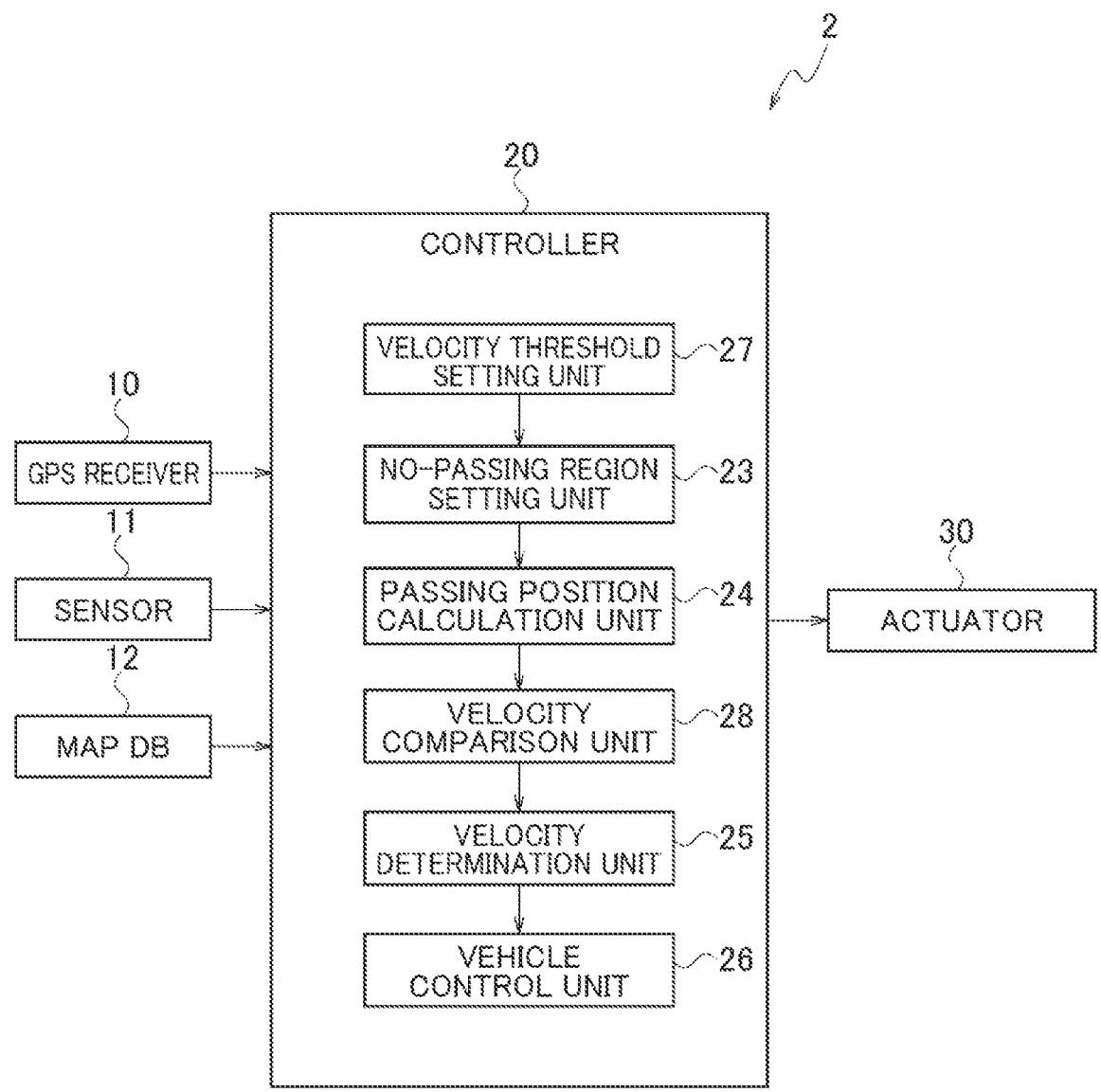
FIG. 13 is a schematic configuration diagram of a vehicle control device according to a second embodiment of the present invention.

As illustrated in FIG. 13, a vehicle control device 2 according to the second embodiment further includes a velocity threshold setting unit 27 and a velocity comparison unit 28. The vehicle control device 2 differs from the vehicle control device 1 according to the first embodiment in not including the switch line setting unit 21 or the stop line setting unit 22.

Figure 14:
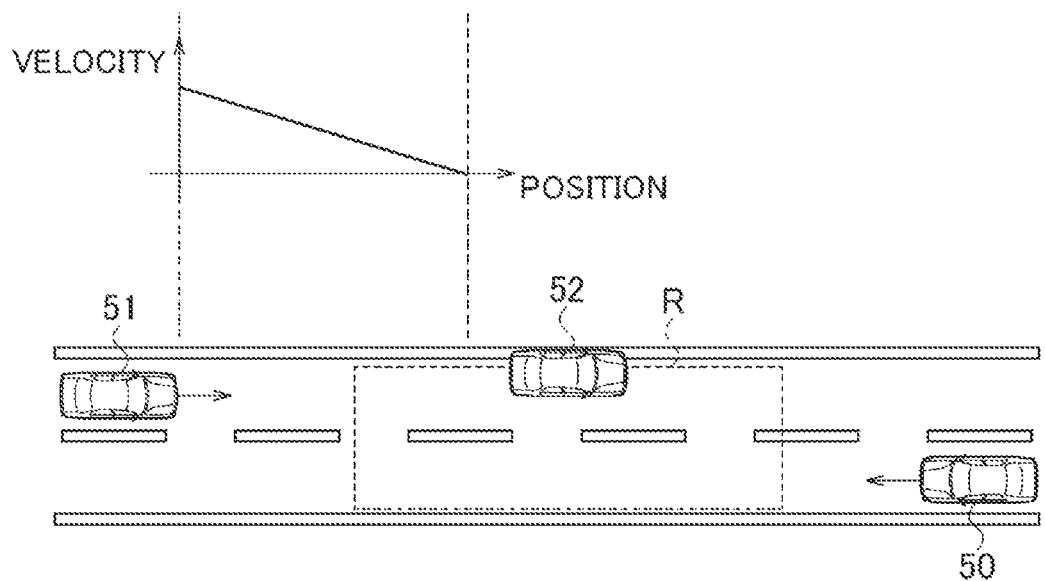
FIG. 14 is a view explaining a velocity threshold according to the second embodiment of the present invention.

The velocity threshold setting unit 27 sets a velocity threshold used in the velocity comparison unit 28. In particular, as illustrated in FIG. 14, the velocity threshold setting unit 27 generates a velocity profile that leads the oncoming vehicle 51 to stop in front of the parked vehicle 52 after starting decelerating at a constant deceleration rate from a certain position (which can be the current position) of the oncoming vehicle 51. The velocity regarding the velocity profile generated by the velocity threshold setting unit 27 is greater as the distance between the parked vehicle 52 and the oncoming vehicle 51 is longer.

Figure 15:
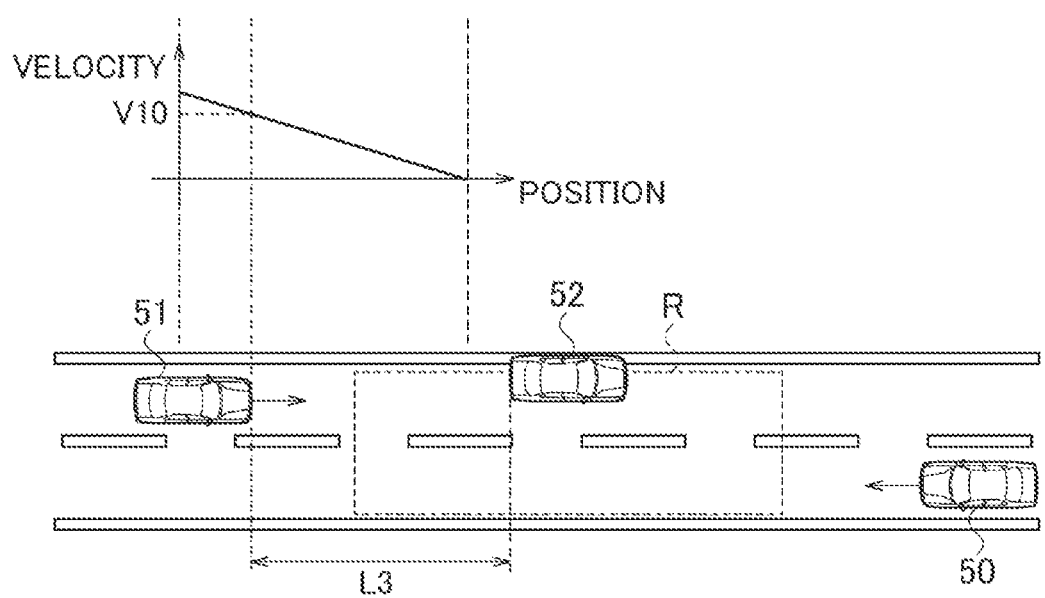
FIG. 15 is a view explaining the velocity threshold according to the second embodiment of the present invention.
Figure 16:
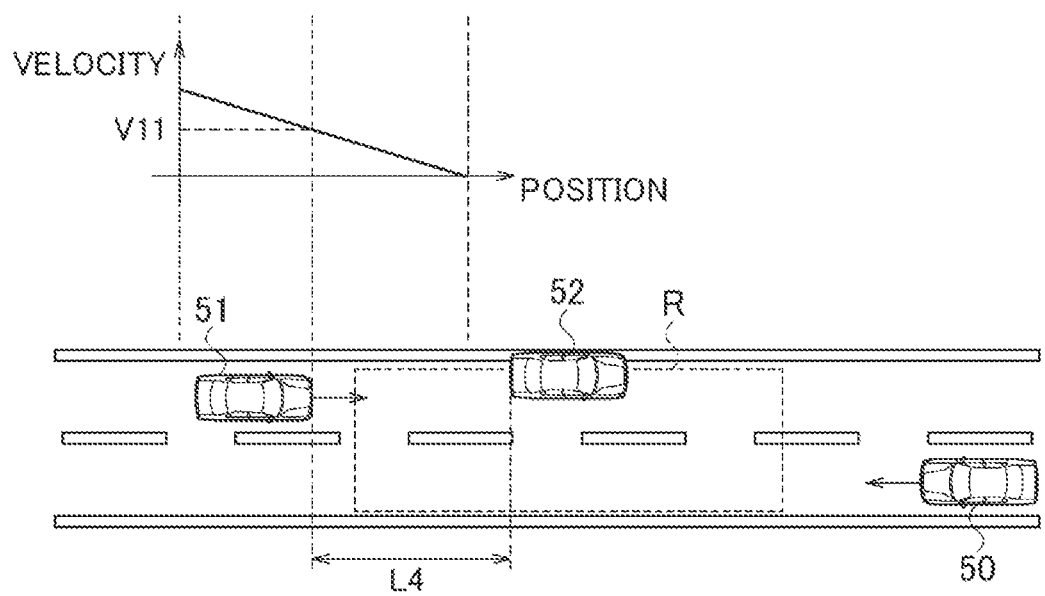
FIG. 16 is a view explaining the velocity threshold according to the second embodiment of the present invention.

The velocity threshold setting unit 27 sets a velocity threshold based on the generated velocity profile. In particular, as illustrated in FIG. 15, the velocity threshold setting unit 27 sets the velocity regarding the velocity profile as a velocity threshold corresponding to a position of the oncoming vehicle 51 distant from the parked vehicle 52 by a predetermined distance (a distance L3). The set velocity threshold in the example illustrated in FIG. 15 is V10. FIG. 16 illustrates another example in which the velocity threshold setting unit 27 sets the velocity regarding the velocity profile as a velocity threshold corresponding to a position of the oncoming vehicle 51 distant from the parked vehicle 52 by a predetermined distance (a distance L4). The set velocity threshold in the example illustrated in FIG. 16 is V11. The examples described above satisfy the relations of L3>L4, and V10>V11. The velocity threshold is thus greater as the distance between the parked vehicle 52 and the oncoming vehicle 51 is longer.

The velocity comparison unit 28 compares the velocity threshold set by the velocity threshold setting unit 27 with the velocity of the oncoming vehicle 51. In the example illustrated in FIG. 15, in the case in which the passing position P1 is present within the no-passing region R, the velocity comparison unit 28 compares the velocity threshold V10 corresponding to the position of the oncoming vehicle 51 distant from the parked vehicle 52 by the distance L3 with the velocity of the oncoming vehicle 51 corresponding to the position of the oncoming vehicle 51 distant from the parked vehicle 52 by the distance L3. The velocity comparison unit 28 outputs the result of the comparison to the velocity determination unit 25.

When the velocity of the oncoming vehicle 51 is the velocity threshold V10 or greater, the velocity determination unit 25 estimates that the intention of the driver of the oncoming vehicle 51 is to pass by the parked vehicle 52 without waiting for the host vehicle 50. The velocity determination unit 25 in this case determines the deceleration rate of the host vehicle 50 so as to smoothly stop at the stop line 61 in order to avoid a collision between the oncoming vehicle 51 and the host vehicle 50.

When the velocity of the oncoming vehicle 51 is less than the velocity threshold V10, the velocity determination unit 25 estimates that the intention of the driver of the oncoming vehicle 51 is to wait for the host vehicle 50 to pass the parked vehicle 52. The velocity determination unit 25 in this case determines to cause the host vehicle 50 to keep the current velocity or accelerate so as to lead the host vehicle 50 to pass the parked vehicle 52 before the oncoming vehicle 51. The vehicle control device 2 according to the second embodiment as described above estimates the intention of the driver of the oncoming vehicle 51, and determines the velocity of the host vehicle 50 in accordance with the estimated intention, so as to avoid sudden braking or unnecessary acceleration or deceleration.

In the second embodiment, the no-passing region setting unit 23 sets the no-passing region R without using the switch line 60 or the stop line 61. For example, the no-passing region setting unit 23 can set the no-passing region R on the road defined in a predetermined region in the road extending direction including the parked vehicle 52 (refer to FIG. 14).

Modified Example 1

A modified example 1 according to the second embodiment is described below. The vehicle control device 2 is illustrated above with the case of not including the switch line setting unit 21, but is not limited to this case. The vehicle control device 2 may include the switch line setting unit 21.

When the vehicle control device 2 includes the switch line setting unit 21, the velocity comparison unit 28 can compare the velocity threshold with the velocity of the oncoming vehicle 51 by use of the switch line 60. In particular, the velocity comparison unit 28 compares the velocity threshold with the velocity of the oncoming vehicle 51 when the position of the oncoming vehicle 51 is located behind the switch line 60 in the traveling direction of the host vehicle 50 as viewed from the host vehicle 50. The method of determining the velocity in accordance with the result of the comparison is the same as described above, and overlapping explanations are not repeated below. The vehicle control device 2 according to the modified example 1 as described above estimates the intention of the driver of the oncoming vehicle 51, and determines the velocity of the host vehicle 50 in accordance with the estimated intention, so as to avoid sudden braking or unnecessary acceleration or deceleration.

Modified Example 2

A modified example 2 according to the second embodiment is described below. The vehicle control device 2 according to the modified example 2 also includes the switch line setting unit 21. The vehicle control device 2 according to the modified example 2 has the functions similar to those in the vehicle control device 2 according to the modified example 1. The vehicle control device 2 according to the modified example 2 estimates the intention of the driver of the oncoming vehicle 51 by use of the acceleration rate of the oncoming vehicle 51 in addition to the velocity of the oncoming vehicle 51.

In particular, in the case in which the passing position P1 is present within the no-passing region R, when the position of the oncoming vehicle 51 is located in front the switch line 60 in the traveling direction of the host vehicle 50 as viewed from the host vehicle 50, and when the velocity of the oncoming vehicle 51 is increased, the velocity determination unit 25 may estimate that the intention of the driver of the oncoming vehicle 51 is to pass by the parked vehicle 52 without waiting for the host vehicle 50. The velocity determination unit 25 in this case may determine the deceleration rate of the host vehicle 50 so as to smoothly stop at the stop line 61 in order to avoid a collision between the oncoming vehicle 51 and the host vehicle 50.

In the case in which the passing position P1 is present within the no-passing region R, when the position of the oncoming vehicle 51 is located in front the switch line 60 in the traveling direction of the host vehicle 50 as viewed from the host vehicle 50, and when the velocity of the oncoming vehicle 51 is not increased, the velocity determination unit 25 may estimate that the intention of the driver of the oncoming vehicle 51 is to wait for the host vehicle 50 to pass the parked vehicle 52. The velocity determination unit 25 in this case may determine to cause the host vehicle 50 to keep the current velocity or accelerate so as to lead the host vehicle 50 to pass the parked vehicle 52 before the oncoming vehicle 51. The vehicle control device 2 according to the modified example 2 as described above estimates the intention of the driver of the oncoming vehicle 51, so as to determine the velocity of the host vehicle 50 in accordance with the estimated intention. This can avoid sudden braking or unnecessary acceleration or deceleration accordingly.

Modified Example 3

A modified example 3 according to the second embodiment is described below. The vehicle control device 2 according to the modified example 3 also includes the switch line setting unit 21. The vehicle control device 2 according to the modified example 3 has the functions similar to those in the vehicle control device 2 according to the modified example 1. The vehicle control device 2 according to the modified example 3 estimates the intention of the driver of the oncoming vehicle 51 by use of the velocity and the acceleration rate of the oncoming vehicle 51 on the front side of the switch line 60.

In particular, in the case in which the passing position P1 is present within the no-passing region R, when the position of the oncoming vehicle 51 is located in front the switch line 60 in the traveling direction of the host vehicle 50 as viewed from the host vehicle 50, and when the velocity of the oncoming vehicle 51 is the velocity threshold or greater, or the velocity of the oncoming vehicle 51 is increased, the velocity determination unit 25 may estimate that the intention of the driver of the oncoming vehicle 51 is to pass by the parked vehicle 52 without waiting for the host vehicle 50. The velocity determination unit 25 in this case may determine the deceleration rate of the host vehicle 50 so as to smoothly stop at the stop line 61 in order to avoid a collision between the oncoming vehicle 51 and the host vehicle 50.

In the case in which the passing position P1 is present within the no-passing region R, when the position of the oncoming vehicle 51 is located in front the switch line 60 in the traveling direction of the host vehicle 50 as viewed from the host vehicle 50, when the velocity of the oncoming vehicle 51 is less than the velocity threshold, and when the velocity of the oncoming vehicle 51 is not increased, the velocity determination unit 25 may estimate that the intention of the driver of the oncoming vehicle 51 is to wait for the host vehicle 50 to pass the parked vehicle 52. The velocity determination unit 25 in this case may determine to cause the host vehicle 50 to keep the current velocity or accelerate so as to lead the host vehicle 50 to pass the parked vehicle 52 before the oncoming vehicle 51. The vehicle control device 2 according to the modified example 3 as described above estimates the intention of the driver of the oncoming vehicle 51, so as to determine the velocity of the host vehicle 50 in accordance with the estimated intention. This can avoid sudden braking or unnecessary acceleration or deceleration accordingly.

The respective functions described above in the respective embodiments can be implemented in single or plural processing circuits. The respective processing circuits include a programmed processing device, such as a processing device including an electric circuit. The respective processing circuits include an application-specific integrated circuit (ASIC) configured to execute the functions described above, and a device such as a circuit component. The vehicle control devices described above can improve the functions of the computer.

While the present invention has been described above by reference to the respective embodiments, it should be understood that the present invention is not intended to be limited to the descriptions and the drawings composing part of this disclosure. Various alternative embodiments, examples, and technical applications will be apparent to those skilled in the art according to this disclosure.

For example, the respective embodiments are illustrated above with the case of the straight road, but may also be applied to a case of a curved road.

REFERENCE SIGNS LIST 1, 2 VEHICLE CONTROL DEVICE
10 GPS RECEIVER
11 SENSOR
12 MAP DATABASE
20 CONTROLLER
21 SWITCH LINE SETTING UNIT
22 STOP LINE SETTING UNIT
23 NO-PASSING REGION SETTING UNIT
24 PASSING POSITION CALCULATION UNIT
25 VELOCITY DETERMINATION UNIT
26 VEHICLE CONTROL UNIT
27 VELOCITY THRESHOLD SETTING UNIT
28 VELOCITY COMPARISON UNIT
30 ACTUATOR

The invention claimed is:

1. A vehicle control method comprising:
   detecting a position of a stationary object on a road on which a host vehicle is traveling;
   detecting a velocity of the host vehicle;
   detecting a position and a velocity of an oncoming vehicle traveling in a direction opposite to a traveling direction of the host vehicle in an oncoming lane adjacent to a traveling lane in which the host vehicle is traveling;
   setting a region on the road defined in an extending direction of the road including the stationary object;
   calculating a passing position at which the host vehicle and the oncoming vehicle pass each other in accordance with the velocity of the host vehicle and the position and the velocity of the oncoming vehicle;
   setting a velocity threshold that is greater as a distance between the stationary object and the oncoming vehicle is longer;
   causing the host vehicle to decelerate when the velocity of the oncoming vehicle corresponding to the position of the oncoming vehicle distant from the stationary object by a predetermined distance is greater than or equal to the velocity threshold corresponding to the position of the oncoming vehicle distant from the stationary object by the predetermined distance in a case in which the passing position is present within the region; and
   causing the host vehicle to keep the velocity or accelerate when the velocity of the oncoming vehicle corresponding to the position of the oncoming vehicle distant from the stationary object by the predetermined distance is less than the velocity threshold corresponding to the position of the oncoming vehicle distant from the stationary object by the predetermined distance in the case in which the passing position is present within the region.

2. A vehicle control method comprising:
   detecting a position of a stationary object on a road on which a host vehicle is traveling;
   detecting a velocity of the host vehicle;
   detecting a position and a velocity of an oncoming vehicle traveling in a direction opposite to a traveling direction of the host vehicle in an oncoming lane adjacent to a traveling lane in which the host vehicle is traveling;
   setting a virtual switch line extending in a lane width direction in the oncoming lane at a position distant from the stationary object by a predetermined distance in the traveling direction of the host vehicle;
   setting a virtual stop line in the traveling lane at a position distant from the stationary object by a predetermined distance in a traveling direction of the oncoming vehicle;
   setting a region on the road defined between the switch line and the stop line so as to include the switch line and the stop line;
   calculating a passing position at which the host vehicle and the oncoming vehicle pass each other in accordance with the velocity of the host vehicle and the position and the velocity of the oncoming vehicle;
   causing the host vehicle to decelerate when the position of the oncoming vehicle is located in front of the switch line in the traveling direction of the host vehicle as viewed from the host vehicle, and the velocity of the oncoming vehicle is increased in a case in which the passing position is present within the region; and
   causing the host vehicle to keep the velocity or accelerate when the position of the oncoming vehicle is located in front of the switch line in the traveling direction of the host vehicle as viewed from the host vehicle, and the velocity of the oncoming vehicle is not increased in the case in which the passing position is present within the region.

3. The vehicle control method according to claim 1, further comprising
setting a virtual switch line extending in a lane width direction in the oncoming lane at a position distant from the stationary object by a predetermined distance in the traveling direction of the host vehicle,
wherein, in the case in which the passing position is present within the region, the host vehicle is caused to decelerate when the position of the oncoming vehicle is located behind the switch line in the traveling direction of the host vehicle as viewed from the host vehicle, and the velocity of the oncoming vehicle corresponding to the position of the oncoming vehicle distant from the stationary object by the predetermined distance is greater than or equal to the velocity threshold corresponding to the position of the oncoming vehicle distant from the stationary object by the predetermined distance, and
in the case in which the passing position is present within the region, the host vehicle is caused to keep the velocity or accelerate when the position of the oncoming vehicle is located behind the switch line in the traveling direction of the host vehicle as viewed from the host vehicle, and the velocity of the oncoming vehicle corresponding to the position of the oncoming vehicle distant from the stationary object by the predetermined distance is less than the velocity threshold corresponding to the position of the oncoming vehicle distant from the stationary object by the predetermined distance.

4. The vehicle control method according to claim 3, wherein:
in the case in which the passing position is present within the region, the host vehicle is caused to decelerate when the position of the oncoming vehicle is located in front of the switch line in the traveling direction of the host vehicle as viewed from the host vehicle, and the velocity of the oncoming vehicle is increased; and
in the case in which the passing position is present within the region, the host vehicle is caused to keep the velocity or accelerate when the position of the oncoming vehicle is located in front of the switch line in the traveling direction of the host vehicle as viewed from the host vehicle, and the velocity of the oncoming vehicle is not increased.

5. The vehicle control method according to claim 3, wherein:
in the case in which the passing position is present within the region, the host vehicle is caused to decelerate when the position of the oncoming vehicle is located in front of the switch line in the traveling direction of the host vehicle as viewed from the host vehicle, and the velocity of the oncoming vehicle is greater than or equal to the velocity threshold, or the velocity of the oncoming vehicle is increased; and
in the case in which the passing position is present within the region, the host vehicle is caused to keep the velocity or accelerate when the position of the oncoming vehicle is located in front of the switch line in the traveling direction of the host vehicle as viewed from the host vehicle, the velocity of the oncoming vehicle is less than the velocity threshold, and the velocity of the oncoming vehicle is not increased.

6. The vehicle control method according to claim 1, further comprising:
setting a virtual switch line extending in a lane width direction in the oncoming lane at a position distant from the stationary object by a predetermined distance in the traveling direction of the host vehicle;
setting a virtual stop line in the traveling lane at a position distant from the stationary object by a predetermined distance in a traveling direction of the oncoming vehicle; and
setting a region on the road defined between the switch line and the stop line so as to include the switch line and the stop line,
wherein the passing position at which the host vehicle and the oncoming vehicle pass each other is calculated in accordance with the velocity of the host vehicle and the position and the velocity of the oncoming vehicle,
in the case in which the passing position is present within the region, the host vehicle is caused to decelerate when the position of the oncoming vehicle is located behind the switch line in the traveling direction of the host vehicle as viewed from the host vehicle and the velocity of the oncoming vehicle is greater than or equal to a predetermined velocity, or when the position of the oncoming vehicle is located in front of the switch line in the traveling direction of the host vehicle as viewed from the host vehicle and the velocity of the oncoming vehicle is increased, and
in the case in which the passing position is present within the region, the host vehicle is caused to keep the velocity or accelerate when the position of the oncoming vehicle is located behind the switch line in the traveling direction of the host vehicle as viewed from the host vehicle and the velocity of the oncoming vehicle is less than the predetermined velocity, or when the position of the oncoming vehicle is located in front of the switch line in the traveling direction of the host vehicle as viewed from the host vehicle and the velocity of the oncoming vehicle is not increased.

7. The vehicle control method according to claim 6, wherein, in the case in which the passing position is present within the region, the host vehicle is caused to decelerate so as to stop at the stop line when the position of the oncoming vehicle is located behind the switch line in the traveling direction of the host vehicle as viewed from the host vehicle and the velocity of the oncoming vehicle is greater than or equal to the predetermined velocity, or when the position of the oncoming vehicle is located in front of the switch line in the traveling direction of the host vehicle as viewed from the host vehicle and the velocity of the oncoming vehicle is increased.

8. The vehicle control method according to claim 6 or 7, wherein the switch line is set in accordance with a position at which the oncoming vehicle can stop.

9. The vehicle control method according to claim 8, further comprising:
setting a virtual second stop line in the oncoming lane at a position distant from the stationary object by a second predetermined distance in the traveling direction of the host vehicle; and
acquiring or generating a velocity profile that leads the oncoming vehicle to stop at the virtual second stop line in accordance with the position and the velocity of the oncoming vehicle,
wherein the switch line is set at a position at which a velocity regarding the velocity profile is a second predetermined velocity.

10. The vehicle control method according to claim 8, wherein, when an actual stop line is present behind the stationary object in the oncoming lane, the switch line is set at a position corresponding to the actual stop line.

11. The vehicle control method according to claim 8, wherein, when a point at which two or more roads intersect with each other is present behind the stationary object, the switch line is set immediately in front of a position at which the oncoming vehicle enters an intersecting point.

12. The vehicle control method according to claim 9, further comprising
subtracting the velocity regarding the velocity profile from the velocity of the oncoming vehicle to calculate a velocity difference when the position of the oncoming vehicle is located behind the switch line in the traveling direction of the host vehicle as viewed from the host vehicle,
wherein the host vehicle is caused to decelerate when the velocity difference is greater than or equal to a first predetermined value,
the host vehicle is caused to keep the velocity or accelerate when the velocity difference is less than a second predetermined value, and
the host vehicle is caused to keep the velocity or accelerate when the velocity difference is less than the first predetermined value and greater than or equal to the second predetermined value.

13. The vehicle control method according to claim 9, further comprising
comparing the velocity of the oncoming vehicle for a predetermined time with the velocity regarding the velocity profile for the predetermined time when the position of the oncoming vehicle is located behind the switch line in the traveling direction of the host vehicle as viewed from the host vehicle,
wherein the host vehicle is caused to decelerate when the velocity of the oncoming vehicle for the predetermined time is greater than the velocity regarding the velocity profile for the predetermined time, and
the host vehicle is caused to keep the velocity or accelerate when the velocity of the oncoming vehicle for the predetermined time is less than the velocity regarding the velocity profile for the predetermined time.

14. The vehicle control method according to claim 9, further comprising:
calculating an average of velocities of the oncoming vehicle for a predetermined time and an average of velocities regarding the velocity profile for the predetermined time when the position of the oncoming vehicle is located behind the switch line in the traveling direction of the host vehicle as viewed from the host vehicle; and
subtracting the average of the velocities regarding the velocity profile for the predetermined time from the average of the velocities of the oncoming vehicle for the predetermined time to calculate a second velocity difference,
wherein the host vehicle is caused to decelerate when the second velocity difference is greater than or equal to a third predetermined value,
the host vehicle is caused to keep the velocity or accelerate when the second velocity difference is less than a fourth predetermined value, and
the host vehicle is caused to keep the velocity or accelerate when the second velocity difference is less than the third predetermined value and greater than or equal to the fourth predetermined value.

15. The vehicle control method according to claim 6, wherein:
the host vehicle is caused to decelerate when the position of the oncoming vehicle is located in front of the switch line in the traveling direction of the host vehicle as viewed from the host vehicle, and the velocity of the oncoming vehicle is increased, or the oncoming vehicle is coming close to a boundary line indicating a boundary between the traveling lane and the oncoming lane; and
the host vehicle is caused to keep the velocity or accelerate when the position of the oncoming vehicle is located in front of the switch line in the traveling direction of the host vehicle as viewed from the host vehicle, and the velocity of the oncoming vehicle is not increased, or the oncoming vehicle does not come close to the boundary line.

16. The vehicle control method according to claim 6, wherein:
the host vehicle is caused to decelerate when the position of the oncoming vehicle is located in front of the switch line in the traveling direction of the host vehicle as viewed from the host vehicle, and an acceleration rate of the oncoming vehicle is a predetermined acceleration rate or greater;
the host vehicle is caused to keep the velocity when the position of the oncoming vehicle is located in front of the switch line in the traveling direction of the host vehicle as viewed from the host vehicle, and the acceleration rate of the oncoming vehicle is less than the predetermined acceleration rate; and
the host vehicle is caused to accelerate when the position of the oncoming vehicle is located in front of the switch line in the traveling direction of the host vehicle as viewed from the host vehicle, and the acceleration rate of the oncoming vehicle does not reach the predetermined acceleration rate within a predetermined time.

17. The vehicle control method according to claim 15, wherein:
the host vehicle is caused to decelerate when the position of the oncoming vehicle is located in front of the switch line in the traveling direction of the host vehicle as viewed from the host vehicle, and a distance between the boundary line and the oncoming vehicle is a third predetermined distance or shorter;
the host vehicle is caused to keep the velocity when the position of the oncoming vehicle is located in front of the switch line in the traveling direction of the host vehicle as viewed from the host vehicle, and the distance between the boundary line and the oncoming vehicle is longer than the third predetermined distance; and
the host vehicle is caused to accelerate when the position of the oncoming vehicle is located in front of the switch line in the traveling direction of the host vehicle as viewed from the host vehicle, and the distance between the boundary line and the oncoming vehicle does not fall below the third predetermined distance within a predetermined time.

18. A vehicle control device comprising:
a first sensor configured to detect a position of a stationary object on a road on which a host vehicle is traveling;
a second sensor configured to detect a velocity of the host vehicle;
a third sensor configured to detect a position of an oncoming vehicle traveling in a direction opposite to a traveling direction of the host vehicle in an oncoming lane adjacent to a traveling lane in which the host vehicle is traveling;

a fourth sensor configured to detect a velocity of the oncoming vehicle; and a controller configured to control a traveling state of the host vehicle in accordance with data detected by the first sensor, the second sensor, the third sensor, and the fourth sensor, the controller being configured to:

set a region on the road defined in an extending direction of the road including the stationary object;

calculate a passing position at which the host vehicle and the oncoming vehicle pass each other in accordance with the velocity of the host vehicle and the position and the velocity of the oncoming vehicle;

set a velocity threshold that is greater as a distance between the stationary object and the oncoming vehicle is longer;

cause the host vehicle to decelerate when the velocity of the oncoming vehicle corresponding to the position of the oncoming vehicle distant from the stationary object by a predetermined distance is greater than or equal to the velocity threshold corresponding to the position of the oncoming vehicle distant from the stationary object by the predetermined distance in a case in which the passing position is present within the region; and cause the host vehicle to keep the velocity or accelerate when the velocity of the oncoming vehicle corresponding to the position of the oncoming vehicle distant from the stationary object by the predetermined distance is less than the velocity threshold corresponding to the position of the oncoming vehicle distant from the stationary object by the predetermined distance in the case in which the passing position is present within the region.

* * * * *